(12) United States Patent
Malaney

(10) Patent No.: US 9,294,280 B2
(45) Date of Patent: Mar. 22, 2016

(54) LOCATION VERIFICATION IN QUANTUM COMMUNICATIONS

(76) Inventor: Robert Anderson Malaney, East Lindfield (AU)

(*) Notice: Subject to any disclaimer, the term of this patent is extended or adjusted under 35 U.S.C. 154(b) by 367 days.

(21) Appl. No.: 13/501,182

(22) PCT Filed: Oct. 14, 2010

(86) PCT No.: PCT/AU2010/001357
§ 371 (c)(1),
(2), (4) Date: Apr. 10, 2012

(87) PCT Pub. No.: WO2011/044629
PCT Pub. Date: Apr. 21, 2011

(65) Prior Publication Data
US 2012/0195597 A1    Aug. 2, 2012

(30) Foreign Application Priority Data

Oct. 14, 2009  (AU) ................................ 2009905008
Jul. 26, 2010   (AU) ................................ 2010903337

(51) Int. Cl.
| | | |
|---|---|---|
| G01C 3/08 | (2006.01) | |
| H04L 9/32 | (2006.01) | |
| H04L 9/08 | (2006.01) | |
| H04W 12/10 | (2009.01) | |

(52) U.S. Cl.
CPC .............. H04L 9/3215 (2013.01); H04L 9/0852 (2013.01); H04W 12/10 (2013.01); *H04L 2209/80* (2013.01)

(58) Field of Classification Search
CPC . H04L 9/3215; H04L 9/0852; H04L 2209/80; H04W 12/10

USPC .......... 356/3.01, 4.01, 4.07, 5.01, 5.09, 9, 625
See application file for complete search history.

(56) References Cited

U.S. PATENT DOCUMENTS

| | | | |
|---|---|---|---|
| 7,075,438 B2 | 7/2006 | Kent et al. | |
| 7,362,420 B2 | 4/2008 | Zaugg | |
| 7,576,694 B2 | 8/2009 | Anjum et al. | |
| 2005/0216544 A1* | 9/2005 | Grolmusz | ..................... 708/607 |
| 2007/0076884 A1 | 4/2007 | Wellbrock et al. | |
| 2007/0155351 A1* | 7/2007 | Oba et al. | ................... 455/188.2 |
| 2007/0165208 A1* | 7/2007 | Cowburn et al. | ................. 356/71 |
| 2009/0079421 A1* | 3/2009 | Freedman et al. | ......... 324/207.2 |
| 2010/0265077 A1* | 10/2010 | Humble et al. | ............... 340/600 |

OTHER PUBLICATIONS

Groisman, Berry; and Benni Reznik. "Measurements of Semiloca and Nonmaximally Entangled States." Published Aug. 16, 2002, School of Physics and Astronomy, Tel Aviv Israel. All pages, namely p. 66. http://journals.aps.org/pra/pdf/10.1103/PhysRevA.66.022110.*

International Search Report for PCT/AU2010/001357, Completed by the Australian Patent Office on Nov. 24, 2010, 3 Pages.

(Continued)

*Primary Examiner* — Luke Ratcliffe
*Assistant Examiner* — Samantha K Abraham

(57) ABSTRACT

Methods and systems for verifying the location of a communication transceiver using quantum communication channels are described. Communications transceivers at different known locations are used having a secure channel therebetween to verify the location of the communication transceiver at a location to be verified using entangled particles transmitted using the quantum communication channels.

52 Claims, 4 Drawing Sheets

(56) References Cited

OTHER PUBLICATIONS

Chiang et al. Proceedings of the second ACM conference on Wireless network security Mar. 2009, p. 181-192, "Secure and Precise Location Verification Using Distance Bounding and Simultaneous Multilateration."

Buhrman et al. Website http://lanl.arxiv.org/PS_cache/arxiv/pdf/1009/1009.2490v2.pdf, Retrieved on Nov. 2, 2012, 22 Pages. "Position-Based Quantum Crytography: Impossibility and Constructions."

Malaney. Physical Review A 2010, Article 042319, 4 Pages. "Location-dependent communications using quantum entanglement."

* cited by examiner

LOCATION VERIFICATION IN QUANTUM COMMUNICATIONS

CROSS-REFERENCE TO RELATED APPLICATION

This application is the U.S. national phase of PCT Appln. No. PCT/AU2010/001357 filed on Oct. 14, 2010, which claims priority to AU Appln. 2009905008 filed on Oct. 14, 2009, and AU Appln. 2010903337 filed on Jul. 26, 2010, the disclosures of which are incorporated in their entirety by reference herein.

TECHNICAL FIELD

The present invention in general relates to communications and in particular to quantum communications using particles, including quantum mechanically entangled particles.

BACKGROUND

Quantum teleportation, the transfer of unknown quantum state information, has been experimentally verified through a host of experiments. In addition, the key resource underpinning teleportation, quantum entanglement, has been experimentally verified over large ranges. An entanglement measurement over 144 km, achieved using optical free-space communications between two telescopes, proves the validity of ground-station to satellite quantum communications, and is a major step in the path towards a global quantum communications network. In such a network, a combination of satellite and fiber optic links would interconnect a multitude of quantum nodes, quantum devices and quantum computers. In optical fiber, transmission of entangled photons is limited to about 100 km by losses and de-coherence effects. Communications over fiber beyond this range would require use of either quantum repeaters, or the trusted relay paradigm used in a recent deployment of an eight-node quantum network.

Experimental verification of quantum superdense coding has also been achieved through a series of experiments. In superdense coding, two bits of classical information can be transferred at the cost of only one qubit.

Teleportation and superdense coding are strongly related and indeed are often considered as protocols that are the inverse of each other, differing only in how and when teleportation and superdense coding utilize quantum entanglement.

U.S. Pat. No. 7,362,420 B2 (U.S. Ser. No. 11/088,205) issued on 22 Apr. 2008 to Zaugg describes an entangled-photons range finding system and method. That is, the location of an object is found using quantum entanglement that is said to be substantially immune to detection by others. The method and system are directed to a new radar technique and is not applicable to quantum networks. The distance to an object is determined using simultaneously generated first and second photons. The first photon is reflected off an object, and the second photon is directed to an optical cavity. The arrival of the first photon is correlated with the arrival of the second photon, and the distance to the object is at least partially determined using the correlation.

However, the method and system of U.S. Pat. No. 7,362,420 do not find the location in an unconditional manner. In fact, the method and system can be spoofed. An adversary could readily spoof the method and system by using a photon detector to capture any entangled photons sent to the adversary, hold onto the sent entangled photons for awhile, and then send the entangled photons back to the sender. The sender would consequently find a location or position that is false. In fact, the adversary would be at a different position. In practice, distances cannot be measured unconditionally and as such, the method and system of U.S. Pat. No. 7,362,420 cannot verify and thus authenticate the locations of a device.

U.S. Pat. No. 7,075,438 B2 (U.S. Ser. No. 10/903,220) issued on 11 Jul. 2006 to Kent et al. describes tagging systems, and in particular a method of authenticating the position of a tagging device. A Bell pair comprising two photons is separated into first and second entangled particles, which are transmitted from first and second equidistant transmitter devices to the tagging device at a position relative to the transmitter devices and detector devices. The tagging device comprising a quantum gate determines response information by recombining the entangled particles and transmits a signal to the two detector devices, at least one of which records the arrival time of the signal at the receiving detector device. The transmitting devices and detector devices are connected to a management module. The receiving detector device is selected on the basis of the determined response information. The receiving detector device and the arrival time of the signal at the receiving detector device are compared with at least one expected receiving detector device and an expected arrival time of the signal for the expected receiving detector device. If the expected and actual signal arrival times for an expected detector device match, this verifies the position of the tagging device.

U.S. Pat. No. 7,075,438 teaches shining line-of-sight quantum beams of light onto the tagging device, which sets off an alarm if the tagging device is moved away from its position. The system of U.S. Pat. No. 7,075,438 cannot be deployed over a communication network where the sender cannot physically "see" the receiver (i.e. no line-of-sight path). Such a system therefore cannot verify the location of a device behind a wall, for example. Also, the system of U.S. Pat. No. 7,075,438 cannot be deployed over fiber-based communication networks. In emerging quantum networks, transport of quantum information occurs using photons transported over fiber. In a fiber-based communication network, the system of U.S. Pat. No. 7,075,438 can be readily spoofed due to the fact that light travels slower in fiber than air. Also, in most fiber connections, a straight-line fiber path between sender and receiver is unavailable. An adversary could exploit these facts by intercepting quantum signals on the fiber and communicating the quantum signals more quickly to other physical locations under its control using some form of wireless quantum communications alone, or classical wireless communications in conjunction with quantum teleportation. The system of U.S. Pat. No. 7,075,438 B2 is predicated on the need for quantum information to be transported via a line-of-sight path through air, thus rendering it of no value in verifying the location of a device in a communication network.

SUMMARY

In accordance with an aspect of the invention, there is provided a method of verifying the location of a communication transceiver using quantum communication channels. The method comprises: applying unitary transforms to a set of states of particles formed from a random bit sequence by a plurality of communications transceivers at different known locations having a secure channel therebetween; and using the communications transceivers at different known locations to verify the location of the communication transceiver at a location to be verified using the particles transmitted using the quantum communication channels.

In accordance with another aspect of the invention, there is provided a method of verifying the location of a communication transceiver using quantum communication channels. The method comprises: using a plurality of communications transceivers at different known locations having a secure channel therebetween to verify the location of the communication transceiver at a location to be verified using particles transmitted using the quantum communication channels; wherein the communication transceiver at a location to be verified uses dependent information, the dependent information being information required for a step of the method that can only be constructed upon receipt of messages from at least two communications transceivers at different known locations.

The particles may be entangled particles.

The method may further comprise the steps of: choosing from at least three communications transceivers at different known locations groups of communications transceivers and where members of each group of communications transceivers communicate via a secure channel a random bit sequence to be encoded in states of entangled particles with the particles entangled with each other being shared by each member of each group of communications transceivers; applying the unitary transforms to a set of the states of entangled particles formed from the random bit sequence by members of each group of communications transceivers; transmitting to the communication transceiver at the location to be verified the encoded states of entangled particles from each group of communications transceivers via separate communication channels between the members of each group of communications transceivers at known locations and the communication transceiver at the location to be verified, the known locations being different to the location to be verified; transmitting to the communication transceiver at the location to be verified the unitary transforms from each member of each group of communications transceivers at the known locations via separate communication channels; checking by each member of each group of communications transceivers at the known locations for a portion of the transmitted, encoded set of states of entangled particles from the communication transceiver at the location to be verified that is correctly decoded by the communication transceiver at the location to be verified and for the arrival time of the decoded portion of the transmitted, encoded set of states of entangled particles; and verifying the location of the communication transceiver at the location to be verified by the members of each group of communications transceivers at the known locations if the transmitted, encoded set of states of entangled particles from the communication transceiver at the location to be verified is correctly decoded and round-trip times determined by the communications transceivers at the known locations satisfy respective expected round-trip times for the communication transceiver at a location.

Each group of communications transceivers may comprise: a pair of communications transceivers, or triplets of communications transceivers.

Classical information transmitted by the communication transceivers at known locations may be synchronized to arrive simultaneously at the communication transceiver at the location to be verified.

The states of entangled particles may be states of entangled qubit pairs or states of three or more entangled particles.

The unitary transforms comprise: a set of operations that transform the states of the entangled particles into a set of non-orthogonal states; or random unitary transforms; or a set of identity operators, the states of the entangled particles being orthogonal to each other.

The transformed states of entangled particles may be encoded using superdense coding.

The step of transmitting the set of entangled states may comprise: direct transfer of entangled particles; or teleporting the set of entangled particles; or using entanglement swapping.

The particles may be photons.

The method may further comprise the step of transmitting to each member of each group of communications transceivers at the known locations a portion of the transmitted, encoded set of states of entangled particles from the communication transceiver at the location to be verified that is decoded by the communication transceiver at the location to be verified.

The method verifying the location in one dimension of a communication transceiver may further comprise the steps of: choosing two communications transceivers at different known locations communicating via a secure channel a random bit sequence to be encoded in states of entangled particles with the particles entangled with each other being distributed between the two communications transceivers; applying unitary transforms to a set of the states of entangled particles formed from the random bit sequence by the two communications transceivers having the known locations; transmitting to the communication transceiver at the location to be verified the encoded states of entangled particles from the two communications transceivers at the known locations via separate communication channels between the communications transceivers at known locations and the communication transceiver at the location to be verified, the known locations being different to the location to be verified; transmitting to the communication transceiver at the location to be verified the unitary transforms from the two communications transceivers at the known locations via separate communication channels between the at two communications transceivers at known locations and the communication transceiver at the location to be verified, the known locations being different to the location to be verified; checking by the two communications transceivers at the known locations for a portion of the transmitted, encoded set of states of entangled particles from the communication transceiver at the location to be verified that is correctly decoded by the communication transceiver at the location to be verified and for the arrival time of the decoded portion of the transmitted, encoded set of states of entangled particles; and verifying the location of the communication transceiver at the location to be verified by the two communications transceivers at the known locations if the transmitted, encoded set of states of entangled particles from the communication transceiver at the location to be verified is correctly decoded and round-trip times determined by the communications transceivers at the known locations satisfy respective expected round-trip times for the communication transceiver at a location.

The method may further comprise the steps of: creating at least three sets of entangled particles, each set being shared between a communication transceiver at the location to be verified and one of at least three communications transceivers at different known locations, the known locations being different to the location to be verified; communicating between the at least three communications transceivers at different known locations labels identifying which particles at the communication transceiver at the location to be verified are entangled with which particles at each of the at least three communications transceivers at different known locations; generating a random bit sequence at each one of the at least three communications transceivers at different known locations to be encoded in states of entangled particles shared by each one of the at least three communications transceivers at different known locations and the communication transceiver at the location to be verified; transmitting to the communication transceiver at the location to be verified via separate communication channels the entangled particles from the at least three communications transceivers at different known locations; transmitting to the communication transceiver at the location to be verified the labels identifying which particles at the communication transceiver at the location to be verified are entangled with which particles at each of the at least three communications transceivers at different known locations; decoding by the communication transceiver at the location to be verified the random bit sequence encoded in states of entangled particles shared by each one of the at least three communications transceivers at different known locations and the communication transceiver at the location to be verified; transmitting to the at least three communications transceivers at different known locations the random bit sequence encoded in states of entangled particles shared by each one of the at least three communications transceivers at different known locations and the communication transceiver at the location to be verified; and verifying the location of the communication transceiver at the location to be verified by the at least three communications transceivers at different known locations if the transmitted, random bit sequence encoded in states of entangled particles shared by each one of the at least three communications transceivers at different known locations and the communication transceiver at the location to be verified is correctly decoded and round-trip times determined by the communications transceivers at the known locations satisfy respective expected round-trip times for the communication transceiver at a location.

The method may further comprise the steps of: creating two sets of entangled particles, each set being shared between a communication transceiver at the location to be verified and one of two communications transceivers at different known locations, the known locations being different to the location to be verified; communicating between the two communications transceivers at different known locations labels identifying which particles at the communication transceiver at the location to be verified are entangled with which particles at each of the two communications transceivers at different known locations; generating a random bit sequence at each one of the two communications transceivers at different known locations to be encoded in states of entangled particles shared by each one of the two communications transceivers at different known locations and the communication transceiver at the location to be verified; transmitting to the communication transceiver at the location to be verified via separate communication channels the entangled particles from the two communications transceivers at different known locations; transmitting to the communication transceiver at the location to be verified the labels identifying which particles at the communication transceiver at the location to be verified are entangled with which particles at each of the two communications transceivers at different known locations; decoding by the communication transceiver at the location to be verified the random bit sequence encoded in states of entangled particles shared by each one of the two communications transceivers at different known locations and the communication transceiver at the location to be verified; transmitting to the two communications transceivers at different known locations the random bit sequence encoded in states of entangled particles shared by each one of the two communications transceivers at different known locations and the communication transceiver at the location to be verified; and verifying the location of the communication transceiver at the location to be verified by the two communications transceivers at different known locations if the transmitted, random bit sequence encoded in states of entangled particles shared by each one of the two communications transceivers at different known locations and the communication transceiver at the location to be verified is correctly decoded and round-trip times determined by the communications transceivers at the known locations satisfy respective expected round-trip times for the communication transceiver at a location.

The method may comprise the step of encoding a k-bit message by making the $2^k$ states of the entangled particles non-orthogonal using an additional local unitary transformation at each communications transceiver at different known locations.

The method may comprise encrypting classical communications between the communications transceivers at different known locations using QKD or another quantum encryption technique. The method may comprise encrypting classical communications between at least one communications transceiver at a known location and another device using QKD or other quantum encryption techniques. The other device may be the communication transceiver at the location to be verified, for example.

A communication channel can be unconditionally authenticated based on the geographical coordinates of the communication transceiver at the location to be verified.

The method may comprise the step of using dependent information by the communication transceiver at a location to be verified, the dependent information being information required for a step of the method that can only be constructed upon receipt of messages from at least two communications transceivers at different known locations.

The method may comprise transmitting classical information by the communication transceivers at different known locations, the classical information being dependent information The particles may be transmitted by: direct transfer of the particles; or teleporting the particles.

The method may comprise utilising state encoding and deterministically discriminating amongst encoded states within a pre-described time bound at only one location.

The method may comprise encoding a k-bit message by making the $2^k$ states of the particles non-orthogonal using an additional local unitary transformation at each of the communications transceivers at different known locations.

The method may comprise comprising: transmitting using quantum communications channels from each of at least two communications transceivers at different known locations at least one particle of a quantum system to arrive simultaneously with other transmitted particles at the communication transceiver at a location to be verified, each transmitted particle being one of at least two particles of each quantum system; retaining at least one other particle of the respective quantum system by each of the communications transceivers at different known locations; receiving by each of the communications transceivers at different known locations at least one measured result immediately broadcast by the communication transceiver at a location to be verified; calculating a time of receipt by each of the communications transceivers at different known locations, the time of receipt being the round trip time of transmitting the particle of the respective quantum system and receipt of the broadcast measured result; transmitting using quantum communications channels by each of the communications transceivers at different known locations the retained particle to the authenticated communication transceiver; measuring by the authenticated communication transceiver the transmitted retained particles from the communications transceivers at different known locations; and determining whether or not the communication transceiver at a location to be verified is at the location purported to be the location of the communication transceiver at a location to be verified dependent upon the time of receipt by each of the communications transceivers at different known locations and upon the measurement result for the retained particles and the broadcast measured result received by the communications transceivers at different known locations.

The method may comprise transmitting by each of the communications transceivers at different known locations to the authenticated communication transceiver: the time of receipt of the broadcast measured result; or the broadcast measured result received by the communications transceivers at different known locations.

The determining step may be implemented by the authenticated communication transceiver.

The method may comprise: receiving by the communication transceiver at the location to be verified the transmitted particles of the quantum systems from the communications transceivers at different known locations; measuring immediately by the communication transceiver at the location to be verified the received particles of the quantum systems; and broadcasting immediately by the communication transceiver at the location to be verified at least one measured result to the communications transceivers at different known locations.

Each measuring step may be implemented using one type of measurement for one group of particles and at least one other type of measurement for another group of particles.

The at least one measured result may be classically encoded.

The method may comprise the step of verifying the receipt times from the communications transceivers at different known locations are consistent with the communications transceiver being located at a location.

The steps may repeated for all N quantum systems held by each of the communications transceivers at different known locations.

One or more particles of the quantum systems may be a qubit or qudit.

At least one particle may be entangled with another particle.

One or more of the measuring steps may involve a projection onto a GHZ state, a projection onto another multipartite state of the particles of the quantum system, or a Bell state measurement of the particles of the quantum systems.

A device may generate the quantum systems and provides the quantum systems to the communications transceivers at different known locations.

The authenticated communications transceiver may be one of the communications transceivers at different known locations.

One or more of the communications transceivers at different known locations may be a reference station.

One or more of the communications transceivers at different known locations that is different to the authenticated communications transceiver may measure the retained particles.

The communication transceiver at the location to be verified may generate immediately a plurality of measured results.

The communication transceiver at the location to be verified may broadcast immediately the plurality of measured results to the communications transceivers at different known locations.

One or more of the measuring steps may involve the use of an operator having: eigenstates that are non-maximally entangled states; or other states that cannot be locally measured.

One or more of the measuring steps may involve the use of a measurement operator that can only locally prepare eigenstates of the measurement operator In accordance with a further aspect of the invention, there is provided a system for verifying the location of a communication transceiver using quantum communication channels. The system comprises: a secure channel; and a plurality of communications transceivers at different known locations coupled by the secure channel between the communications transceivers at different known locations, the plurality of communications transceivers at different known locations configured to verify the location of the communication transceiver at a location to be verified using particles transmitted using the quantum communications between the communication transceiver at a location to be verified and the plurality of communications transceivers at different known locations; and wherein the communications transceivers at different known locations comprise means for applying unitary transforms to a set of states of particles formed from a random bit sequence by the communications transceivers at different known locations.

In accordance with a still further aspect of the invention, there is provided a system for verifying the location of a communication transceiver using quantum communication channels. The system comprises: a secure channel; and a plurality of communications transceivers at different known locations coupled by the secure channel between the communications transceivers at different known locations, the plurality of communications transceivers at different known locations configured to verify the location of the communication transceiver at a location to be verified using particles transmitted using the quantum communications between the communication transceiver at a location to be verified and the plurality of communications transceivers at different known locations; and wherein the communication transceiver at a location to be verified uses dependent information, the dependent information being information required for a step of the method that can only be constructed upon receipt of messages from at least two communications transceivers at different known locations.

The particles may be entangled particles.

The system may comprise: at least three communications transceivers at different known locations, the at least three communications transceivers communicating via secure channels. The communications transceivers comprise: a module for choosing from at least three communications transceivers at different known locations and means for choosing groups of communications transceivers and where members of each group of communications transceivers communicate via a secure channel a random bit sequence to be encoded in states of entangled particles with the particles entangled with each other being shared by each member of each group of communications transceivers; a module for applying unitary transforms to a set of the states of entangled particles formed from the random bit sequence by members of each group of communications transceivers; a module for transmitting to the communication transceiver at the location to be verified the encoded states of entangled particles from each group of communications transceivers via separate communication channels between the members of each group of communications transceivers at known locations and the communication transceiver at the location to be verified, the known locations being different to the location to be verified;

a module for transmitting to the communication transceiver at the location to be verified the unitary transforms from each member of each group of communications transceivers at the known locations via separate communication channels; a module for checking by the each member of each group of communications transceivers at the known locations for a portion of the transmitted, encoded set of states of entangled particles from the communication transceiver at the location to be verified that is correctly decoded by the communication transceiver at the location to be verified and for the arrival time of the decoded portion of the transmitted, encoded set of states of entangled particles; and a module for verifying the location of the communication transceiver at the location to be verified by each member of each group of communications transceivers at the known locations if the transmitted, encoded set of states of entangled particles from the communication transceiver at the location to be verified is correctly decoded and round-trip times determined by the communications transceivers at the known locations satisfy respective expected round-trip times for the communication transceiver at a location.

The system may comprise a module for encoding a k-bit message by making the $2^k$ states of the entangled particles non-orthogonal using an additional local unitary transformation at each communications transceiver at different known locations.

The system may comprise a module for encrypting classical communications between the communications transceivers at different known locations using QKD or another quantum encryption technique. The system may also comprise a module for encrypting classical communications between at least one communications transceiver at a known location and another device using QKD or other quantum encryption techniques. The other device may be the communication transceiver at the location to be verified, for example.

In accordance with yet another aspect of the invention, there is provided a system for verifying the location of a communications transceiver using quantum communication channels. The system comprises: at least two communications transceivers at different known locations; and an authenticated communications transceiver. The communications transceivers at different known locations each comprise: a module for transmitting using quantum communications channels from each of at least two communications transceivers at different known locations at least one particle of a quantum system to arrive simultaneously with other transmitted particles at the communication transceiver at a location to be verified, each transmitted particle being one of at least two particles of each quantum system; a module for retaining at least one other particle of the respective quantum system by each of the communications transceivers at different known locations; a module for receiving by each of the communications transceivers at different known locations at least one measured result immediately broadcast by the communication transceiver at a location to be verified; a module for calculating a time of receipt by each of the communications transceivers at different known locations, the time of receipt being the round trip time of transmitting the particle of the respective quantum system and receipt of the broadcast measured result. The system further comprises: a module for transmitting using quantum communications channels by each of the communications transceivers at different known locations the retained particle to the authenticated communication transceiver; a module for measuring by the authenticated communication transceiver the transmitted retained particles from the communications transceivers at different known locations; and a module for determining transceiver whether or not the communication transceiver at a location to be verified is at the location purported to be the location of the communication transceiver at a location to be verified dependent upon the time of receipt by each of the communications transceivers at different known locations and upon the measurement result for the retained particles and the broadcast measured result received by the communications transceivers at different known locations.

The system may further comprise a module for transmitting by each of the communications transceivers at different known locations the broadcast measured result received by the communications transceivers at different known locations to an authenticated communication transceiver.

These and other aspects of the invention are set forth in the following description.

BRIEF DESCRIPTION OF DRAWINGS

Embodiments of the invention are described hereinafter with reference to the drawings, in which.

DETAILED DESCRIPTION

Figure 1:
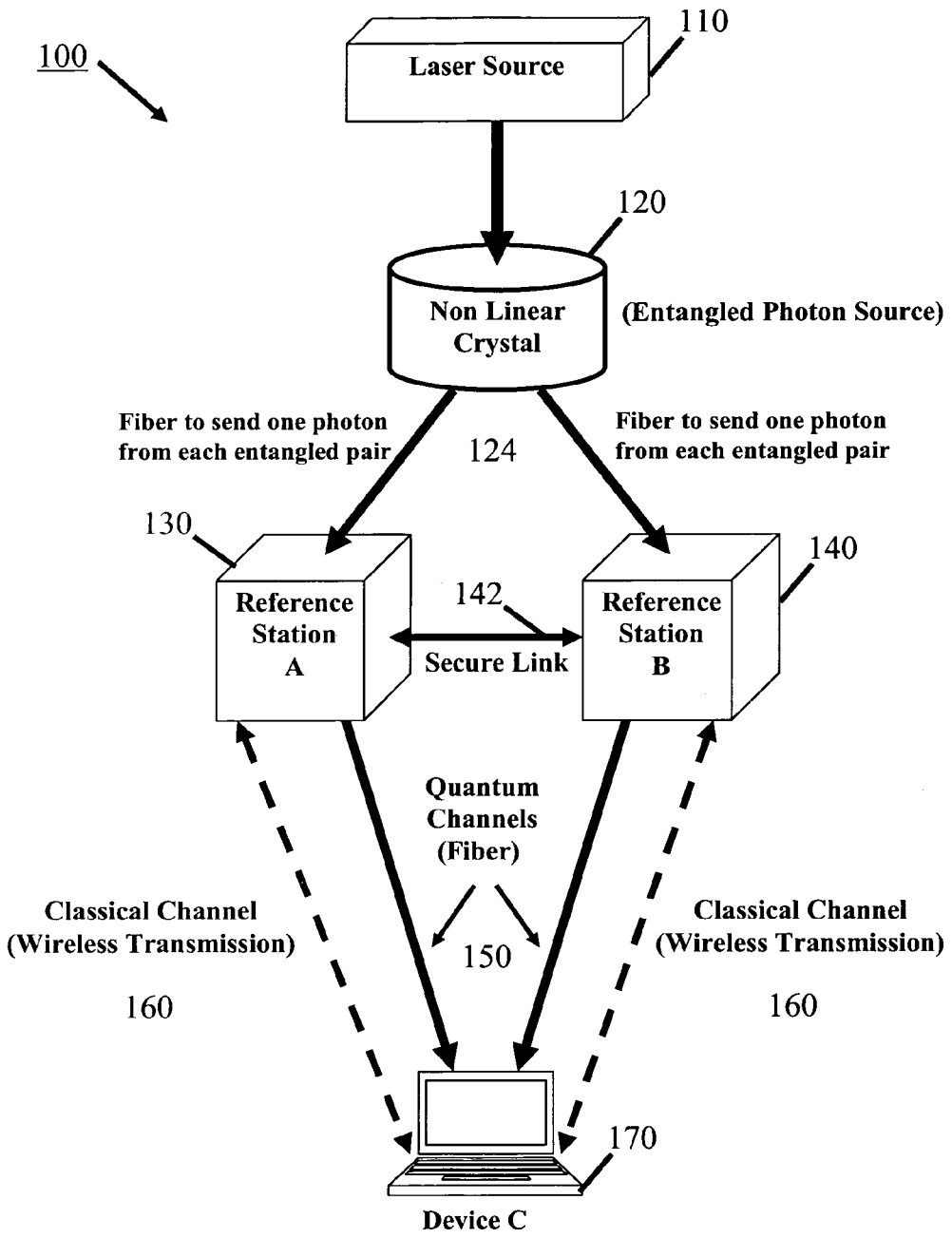
FIG. 1 is a block diagram of a system for verifying the 1D location of a communication transceiver using quantum communication channels with two other communication transceivers at known locations.

Methods and systems are disclosed for verifying the location of a communication transceiver using quantum communication channels. In the following description, numerous specific details and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Where reference is made to "particles of a quantum system" or "a particle of a quantum system", the quantum system may be a single particle where the particle is in a single basis quantum state, or the particle may be in a superposition of possible quantum basis states, such as a qubit, qudit or some other higher-dimensional superposition. The particle may be in a mixed state. The particle may also form a subsystem of a larger quantum system, such as the case for example when the particle is quantum mechanically entangled with another particle or particles. The quantum system may be a pair of entangled qubits.

Quantum location verification is a new protocol that differs in how and when quantum entanglement is used. The embodiments of the invention provide unconditional (see description hereinafter) verification of a location. The embodiments of the invention use quantum entanglement, coupled with quantum superdense coding, to provide a method that makes it impossible for an adversary to claim the adversary is at a position when in reality the adversary is elsewhere.

Quantum location verification represents a new application in the emerging field of quantum communications that delivers an outcome not possible in the classical-only channel. In the embodiments of the invention, a communication channel can be unconditionally authenticated based on the geographical coordinates of a receiver.

There are two principal conditions for robust location verification in quantum communications:
(1) the device or transceiver to be located must be able to immediately (and correctly) respond to multiple signals received from multiple reference stations, and
(2) only a device at one unique location (the authorized location) can fulfil this demand.

As used herein, a communications transceiver (simply "transceiver" hereinafter; the term "device" by itself is used to connote "transceiver") includes any one or more of the following: a base station (e.g. in a wireless network), a satellite, a network access point, a network device, a communication device, and another transceiver or receiver in a communications network. The terms "reference station" and "reference device" are used hereinafter as well and each refers to a communications transceiver at a known location. An authenticated communications transceiver is one that has been authenticated in terms of its location. The authenticated communications transceiver is assumed to possess secure communications between the reference stations via quantum key distribution (QKD), or another quantum encryption technique, in the same manner that communications between the reference stations are secured. Quantum key distribution or another quantum encryption technique may be used with other devices including a communications transceiver at a location to be verified. The difference between an authenticated communications transceiver and a reference station is that the former does not necessarily initially contain any quantum system used in the verification procedure (i.e., does not necessarily transmit any particle to the device at the location to be verified) and does not necessarily measure the time of receipt of any broadcast result. The retained particles from the reference stations, the broadcast result received by reference stations, and the time of receipt of broadcast results at the reference stations are sent to the authenticated communications transceiver following receipt by the reference stations of the broadcast result. The authenticated communications transceiver measures the retained particles sent from the reference stations, checks the result is consistent with the broadcast result received by the reference stations, and checks that receipts times at the reference stations are consistent with the device at a location to be verified being at a specific location. To facilitate teleportation between the authenticated communications transceiver and the reference stations, the authenticated communications transceiver may possess particles entangled with the reference stations. The authenticated communications transceiver may be implemented by a communications transceiver at a known location (i.e. a reference station).

In the classical-only channel these two conditions can never be unconditionally guaranteed. Multiple receivers or transceivers (none of which need be at the authorized location) can collude to circumvent any location verification test by the copying and re-distribution of classical signals. However, with the introduction of quantum communication channels, the two conditions necessary for unconditional location verification can in fact be guaranteed.

Quantum location verification assists in the authentication of devices or transceivers within large-scale multihop quantum networks. Current quantum authentication techniques require the distribution of secret keys distributed amongst potential users. However, such keys, whether classical bits or entangled qubits, are subject to unauthorized re-distribution. Quantum location verification can be used within other data-delivery protocols in which real-time data transfer can be communicated to a device successfully only if that device is at a specific location. Location verification can be monitored continuously in real time, halting any real-time data transfer upon violation of the verification procedures. An adversary could not continue to receive real-time data without one of the adversary's devices being at the specified location.

Broadly speaking, the embodiments of the invention provide methods and systems for verifying the location of a communication transceiver using quantum communication channels. A number of communications transceivers at different known locations are used having a secure channel therebetween to verify the location of the communication transceiver at a location to be verified using entangled particles transmitted using the quantum communication channels.

In one embodiment of the invention, at least three communications transceivers at different known locations are chosen as groups of communications transceivers. Members of each group of communications transceivers communicate via a secure channel a random bit sequence to be encoded in states of entangled particles with the particles entangled with each other being shared by each member of each group of communications transceivers. Unitary transforms are applied to a set of the states of entangled particles formed from the random bit sequence by members of each group of communications transceivers. The encoded states of entangled particles from each group of communications transceivers are transmitted to the communication transceiver at the location to be verified via separate communication channels between the members of each group of communications transceivers at known locations and the communication transceiver at the location to be verified, the known locations being different to the location to be verified. The unitary transforms from each member of each group of communications transceivers at the known locations are transmitted to the communication transceiver at the location to be verified via separate communication channels. Each member of each group of communications transceivers at the known locations checks for a portion of the transmitted, encoded set of states of entangled particles from the communication transceiver at the location to be verified that is correctly decoded by the communication transceiver at the location to be verified and for the arrival time of the decoded portion of the transmitted, encoded set of states of entangled particles. The location of the communication transceiver at the location to be verified is verified by the members of each group of communications transceivers at the known locations if the transmitted, encoded set of states of entangled particles from the communication transceiver at the location to be verified is correctly decoded and round-trip times determined by the communications transceivers at the known locations satisfy respective expected round-trip times for the communication transceiver at a location.

Each group of communications transceivers may comprise a pair of communications transceivers, or triplets of communications transceivers.

Classical information transmitted by the communication transceivers at known locations is synchronized to arrive simultaneously at the communication transceiver at the location to be verified.

The states of entangled particles may be states of entangled qubit pairs or states of three or more entangled particles.

The unitary transforms may comprise a set of operations that transform the states of the entangled particles into a set of non-orthogonal states. The unitary transforms may comprise random unitary transforms, or a set of identity operators, the states of the entangled particles being orthogonal to each other.

The transformed states of entangled particles are encoded using superdense coding.

Transmitting the set of entangled states may comprise direct transfer of entangled particles, teleporting the set of entangled particles, or the use of entanglement swapping.

The particles may be photons.

A portion of the transmitted, encoded set of states of entangled particles from the communication transceiver at the location to be verified that is decoded by the communication transceiver at the location to be verified are transmitted to each member of each group of communications transceivers at the known locations.

These and other aspects of the invention are described in greater detail hereinafter.

Consider some reference stations at publicly known locations, and a device (Cliff) that is to be verified at a publicly known location $(x_v, y_v)$. Processing times (e.g., due to local quantum measurements) are assumed to be negligible. The reference stations, or transceivers at known locations, are assumed to be authenticated and to share secure communication channels between each other via quantum key distribution (QKD). Further, all classical communication between Cliff and the reference stations occur via wireless channels. Wireless communications are used, since the time delay of all classical communications is required to be set by the line-of sight-distance between transceivers divided by c (i.e., the speed of light in a vacuum).

For two-dimensional location verification, a minimum of three reference stations is required.

Consider N maximally entangled multipartite systems available to a network possessing k reference stations and that each of the multipartite systems comprises k qubits, with each reference station initially holding one qubit from each of the N systems. The $2^k$ orthogonal basis states of each multipartite state can be written:

$$|S_b\rangle = \frac{1}{\sqrt{2}}(|a\rangle_1 \otimes |a\rangle_2 \ldots |a\rangle_k \pm |a\rangle_1 \otimes |a\rangle_2 \ldots |a\rangle_k) \quad (1)$$

where $\{b=1, \ldots 2^k\}$, and the states $|a\rangle$ represent $|0\rangle$ or $|1\rangle$ with the index on the state labelling the location.

Transformation between the basis states can be achieved by a set of $2^k$ unitary transformations induced on the locally held qubits. By this means a k-bit message, per entangled state, can be transferred from the stations to Cliff. This is achieved using superdense coding, in which the stations encode each message to a specific basis state $|S_b\rangle$, with Cliff decoding the message via a quantum measurement that deterministically discriminates all possible basis states.

Quantum location verification builds on this concept of state encoding with one significant addition. Deterministic discrimination amongst the encoded states must be possible, within a pre-described time bound at only one location. This can be achieved if the $2^k$ states that encode the k-bit messages are made non-orthogonal by the introduction of an additional local unitary transformation at each reference station. Let these additional transformations be labelled $|U_i^r\rangle$, where $r=1, \ldots k$ indexes the reference station, and $i=1 \ldots N$ references the specific multipartite state to which the local transformation is applied.

Consider the ith encoded multipartite state in which a k-bit message is encoded as $|S_b\rangle$. On application of the additional transformations, a new state) $|\Upsilon_i\rangle = U_i^1 \otimes U_i^2 \otimes \ldots U_i^k |S_b\rangle$ is produced. $\langle \chi_i | \Upsilon_j \rangle \neq 0$ when $|\Upsilon_i\rangle \neq |\Upsilon_j\rangle$ is required. The unitary matrices $U_i^r$ are chosen so that upon measurement of $|\Upsilon_i\rangle$ in a measurement basis $|S_b\rangle$, the probability of collapse to each basis state is approximately equal $(\frac{1}{2}^k)$.

For quantum location verification to be unconditional, an adversary must not be able to map the values of $U_i^r$ to specific k-bit messages (in this protocol all matrices $U_i^r$ and all k-bit messages are ultimately sent over a classical channel). There must be some form of randomness applied to the selection of each $U_i^r$. One strategy that provides for both a random selection mechanism, and the required non-orthogonal behavior between the states $|\Upsilon_i\rangle$, is to allow the $U_i^r$ to be constructed from four random real parameters $(\alpha, \beta, \gamma, \phi)$. The unitary matrix at each reference station can be implemented as:

$$U = e^{i\phi} R_z(\alpha) R_y(\beta) R_z(\gamma), \quad (2)$$

where the rotations R are given by:

$$R_y(\theta) = e^{-i\theta\sigma_y/2} \text{ and } R_z(\theta) = e^{-i\theta\sigma_z/2},$$

and with the σ's representing the Pauli operators. Classical communication of the additional matrices involves the transmission of the values $(\alpha, \beta, \gamma, \phi)$ adopted for each $U_i^r$ (see discussion hereinafter regarding different methods for communicating this information). Of course not every random unitary matrix can actually be experimentally implemented. Later, a more pragmatic implementation strategy is described leading to an outcome effectively the same as the outcome derived from Eq. (2).

The location verification proceeds by the encoding of a secret sequence onto a set of N entangled systems $|\Upsilon_{i=1 \ldots N}\rangle$, transmission of each $|\Upsilon_i\rangle$ to Cliff via quantum channels, followed by transmission of the unitary matrices $U_i^r$ (i.e. the set $(\alpha, \beta, \gamma, \phi)$) to Cliff by classical channels. Upon receiving this quantum and classical information Cliff can decode and broadcast the decoded sequence via the classical channel. Given that information transfer over the classical channel proceeds at a velocity c, location information becomes unconditionally verifiable (as explained hereinafter). Ultimately, the verification is based on the inability to clone deterministically the set $|\Upsilon_i\rangle$ with fidelity one. Although cloning with lower fidelities is possible, confidence levels on the location verification can be increased to any arbitrary level by increasing N.

The protocol is outlined in more detail using well known maximally entangled states (see discussion hereinafter regarding methods using other states). For clarity, a one-dimensional location verification is described using just two reference stations, which henceforth are referred to as Alice and Bob. A geometrical constraint for one-dimensional location verification is that the device to be located must lie between Alice and Bob. That is, $\tau_{AC} + \tau_{BC} = \tau_{AB}$, where $\tau_{AC}$ ($\tau_{BC}$) is the light travel time between Alice (Bob) and Cliff, and where $\tau_{AB}$ is the light travel time between Alice and Bob.

Let Alice share with Bob a set of N maximally entangled qubit pairs $|\Omega_i^{AB}\rangle$ where the subscript $i=1 \ldots N$ labels the entangled pairs. Let each of the pairs be described by one of the Bell states $$|\Phi^{\pm}\rangle = \frac{1}{\sqrt{2}}(|00\rangle \pm |11\rangle), |\Psi^{\pm}\rangle = \frac{1}{\sqrt{2}}(|01\rangle \pm |10\rangle),$$

with the first qubit being held by Alice and the second by Bob. An encoding ((00→$\Phi^+$ etc.) is assumed that is public.

Without loss of generality, all pairs are assumed initially in the state $|\Phi^+\rangle$. After the encoding of a sequence onto a series of entangled pairs, Alice and Bob apply an additional random unitary transformation $U_i^A$ and $U_i^B$, respectively, to their local qubit from each pair. As a consequence, the entangled pairs held by Alice and Bob now form a non-orthogonal set:

$$|\Upsilon_i^{AB}\rangle = U_i^A \otimes U_i^B |\Omega_i^{AB}\rangle \quad (3a)$$

For example, for $|\Phi^+\rangle$, Eq. (3a) leads to a state:

$$\frac{1}{\sqrt{2}}(U_i^A|0\rangle_A \otimes U_i^B|0\rangle_B + U_i^A|1\rangle_A \otimes U_i^B|1\rangle_B).$$

Protocol Step-By-Step
Table 1 provides a step-by-step exposition of the protocol

TABLE 1

| Step 1: | Via a secure channel, Alice and Bob agree on a mutual random bit sequence $S_{ab}$ that is to be encoded. The encoding is achieved via superdense coding, in which two classical bits are encoded using local unitary operators as described by $I|\Phi^+\rangle = |\Phi^+\rangle$, $\sigma_x|\Phi^+\rangle = |\Psi^+\rangle$, $i\sigma_y|\Phi^+\rangle = |\Psi^-\rangle$, and $\sigma_z|\Phi^+\rangle = |\Phi^-\rangle$. For each pair of entangled qubits, Alice and Bob also agree who is to induce the necessary unitary operation on their local qubit to encode sequential two-bit segments of $S_{ab}$. |
|---|---|
| Step 2: | Prior to the transmission of any qubit, the transformation $|\Omega_i^{AB}\rangle \rightarrow |\Upsilon_i^{AB}\rangle$ as described by Eq. (3a) is induced. This set is transmitted by Alice and Bob to Cliff via two separate quantum channels. |
| Step 3: | Alice and Bob communicate to Cliff, via separate classical channels, the random matrices $U_i^A$ and $U_i^B$ used to form the set $|\Upsilon_i^{AB}\rangle$. This classical information is transmitted in a synchronized manner to Cliff such that for each value of i the $U_i^A$ sent by Alice and the $U_i^B$ sent by Bob arrive simultaneously at Cliff's publicly announced location ($x_v$, $y_v$). This classical information is ensured to be received at Cliff after the arrival of the corresponding qubit pair of $|\Upsilon_i^{AB}\rangle$. |
| Step 4: | Upon receipt of each matrix pair $U_i^A$, $U_i^B$, Cliff undertakes the transform $(U_i^A \otimes U_i^B)^\dagger |\Upsilon_i^{AB}\rangle \rightarrow |\Omega_i^{AB}\rangle$ before taking a Bell State Measurement (BSM) to determine the two-bit segment encoded in the entangled pair. Cliff then immediately broadcasts (classically) the decoded two-bit segment back to Alice and Bob. |
| Step 5: | Alice checks that the sequence returned to her by Cliff is correctly decoded and notes the round-trip time for the process. Likewise, Bob does so. Alice and Bob can then compare their round-trip times to Cliff ($2\tau_{AC}$ and $2\tau_{BC}$) to verify consistency with Cliffs publicly reported location ($x_v$, $y_v$). |

Quantum location verification is independent of the physical resources an adversary may possess. In the classical channel, an adversary can place co-operating devices closer to reference stations and then delay responses to defeat any location verification. However, in quantum verification, multiple devices are of no value. To decode immediately, Cliffs transceiver must possess all the qubits that comprise each entangled state. Cliff cannot distribute copies of his local qubits to other devices due to the no-cloning theorem. The key point is that for any given location ($x_v$, $y_v$) that is to undergo a verification process, one can always find placements for the reference stations such that no other location can be simultaneously closer to the reference stations than ($x_v$, $y_v$). This being the case, an adversary with no device at the location being verified cannot pass the verification test. Even if the adversary possesses multiple receivers, an additional round-trip communication time between the adversary's devices is required for decoding. This results in a round-trip time between at least one reference station and the location ($x_v$, $y_v$) being larger than expected. In classical verification, the round-trip communication between the adversary's devices is not required.

Extension of the one-dimensional location verification protocol to two-dimensional verification could be a straightforward application of additional bipartite entanglement between Alice and some third reference station, say Dan. This can be achieved by introduction of a new set of N maximally entangled qubit pairs shared between Alice and Dan, with the protocol following a similar exposition to that given. In this sense, Alice and Dan form a group of reference stations and Alice and Bob form a separate group of reference stations. In this sense, Alice and Dan are members of one group of reference stations, and Alice and Bob are members of another group of reference stations. The group of Alice and Dan go through similar steps to those carried out by the group of Alice and Bob. The only other requirement is that classical messages from Dan arrive at Cliff simultaneously with the classical messages from Alice and Bob.

More specifically the Step-By-Step 2D version of the previous protocol is now given.

Let Alice share with Bob a set of N maximally entangled qubit pairs $|\Omega_i^{AB}\rangle$ where the subscript i=1 ... N labels the entangled pairs. Let each of the pairs be described by one of the Bell states $$|\Phi^{\pm}\rangle = \frac{1}{\sqrt{2}}(|00\rangle \pm |11\rangle), |\Psi^{\pm}\rangle = \frac{1}{\sqrt{2}}(|01\rangle \pm |10\rangle),$$

with the first qubit being held by Alice and the second by Bob. An encoding ((00→$\Phi^+$ etc.) is assumed that is public.

Without loss of generality, all pairs are assumed initially in the state $|\Phi^+\rangle$. After the encoding of a sequence onto a series of entangled pairs, Alice and Bob apply an additional random unitary transformation $U_i^A$ and $U_i^B$, respectively, to their local qubit from each pair. As a consequence, the entangled pairs held by Alice and Bob now form a non-orthogonal set:

$$|\Upsilon_i^{AB}\rangle = U_i^A \otimes U_i^B |\Omega_i^{AB}\rangle.$$

Let Alice also share with Dan a different set of N maximally entangled qubit pairs $|\Omega_i^{AD}\rangle$ where the subscript i=1 . . . N labels the entangled pairs. Let each of the pairs be described by one of the Bell states $$|\Phi^{\pm}\rangle = \frac{1}{\sqrt{2}}(|00\rangle \pm |11\rangle), \quad |\Psi^{\pm}\rangle = \frac{1}{\sqrt{2}}(|01\rangle \pm |10\rangle),$$

with the first qubit being held by Alice and the second by Dan. An encoding ((00→$\Phi^+$ etc.) is assumed that is public.

Without loss of generality, all pairs are assumed initially in the state $|\Omega^+\rangle$. After the encoding of a sequence onto a series of entangled pairs, Alice and Dan apply an additional random unitary transformation $U_i^{A2}$ and $U_i^D$, respectively, to their local qubit from each pair of $|\Omega^{AD}\rangle$. As a consequence, the entangled pairs held by Alice and Dan now form a non-orthogonal set:

$$|\Upsilon_i^{AD}\rangle = U_i^{A2} \otimes U_i^D |\Omega_i^{AD}\rangle. \quad (3b)$$

Note that the cases $U_i^{A2} = U_i^A$ and $U_i^{A2} \neq U_i^A$ are allowed. Here, the latter is assumed.

Table 2 provides a step-by-step exposition of the protocol for 2-dimensional verification

TABLE 2

| | |
|---|---|
| Step 1: | Via a secure channel, Alice and Bob agree on a mutual random bit sequence $S_{ab}$ that is to be encoded. The encoding is achieved via superdense coding, in which two classical bits are encoded using local unitary operators as described by $I|\Phi^+\rangle=|\Phi^+\rangle$, $\sigma_x|\Phi^+\rangle=|\Psi^+\rangle$, $i\sigma_y|\Phi^+\rangle=|\Psi^-\rangle$, and $\sigma_z|\Phi^+\rangle=|\Phi^-\rangle$. For each pair of entangled qubits, Alice and Bob also agree who is to induce the necessary unitary operation on their local qubit to encode sequential two-bit segments of $S_{ab}$.<br>In addition: Via a secure channel, Alice and Dan agree on a mutual random bit sequence $S_{ad}$ that is to be encoded. The encoding is achieved via superdense coding, in which two classical bits are encoded using local unitary operators as described by $I|\Phi^+\rangle=|\Phi^+\rangle$, $\sigma_x|\Phi^+\rangle=|\Psi^+\rangle$, $i\sigma_y|\Phi^+\rangle=|\Psi^-\rangle$, and $\sigma_z|\Phi^+\rangle=|\Phi^-\rangle$. For each pair of entangled qubits, Alice and Dan also agree who is to induce the necessary unitary operation on their local qubit to encode sequential two-bit segments of $S_{ad}$. |
| Step 2: | Prior to the transmission of any qubit, the transformation $|\Omega_i^{AB}\rangle \rightarrow |\Upsilon_i^{AB}\rangle$ as described by Eq. (3a) is induced. This set is transmitted by Alice and Bob to Cliff via two separate quantum channels.<br>In addition: Prior to the transmission of any qubit, the transformation $|\Omega_i^{AD}\rangle \rightarrow |\Upsilon_i^{AD}\rangle$ as described by Eq. (3b) is induced. This set is transmitted by Alice and Dan to Cliff via two separate quantum channels. |
| Step 3: | Alice and Bob communicate to Cliff, via separate classical channels, the random matrices $U_i^A$ and $U_i^B$ used to form the set $|\Upsilon_i^{AB}\rangle$. This classical information is transmitted in a synchronized manner to Cliff such that for each value of i the $U_i^A$ sent by Alice and the $U_i^B$ sent by Bob arrive simultaneously at Cliff's publicly announced location $(x_v, y_v)$. This classical information is ensured to be received at Cliff after the arrival of the corresponding qubit pair of $|\Upsilon_i^{AB}\rangle$.<br>In addition: Alice and Dan communicate to Cliff, via separate classical channels, the random matrices $U_i^{A2}$ and $U_i^D$ used to form the set $|\Upsilon_i^{AD}\rangle$. This classical information is transmitted in a synchronized manner to Cliff such that for each value of i the $U_i^A$ and $U_i^{A2}$ sent by Alice and the $U_i^D$ sent by Dan and the $U_i^B$ sent by Bob arrive simultaneously at Cliff's publicly announced location $(x_v, y_v)$. This classical information is ensured to be received at Cliff after the arrival of the corresponding qubit pair of $|\Upsilon_i^{AD}\rangle$. |
| Step 4: | Upon receipt of each matrix pair $U_i^A$, $U_i^B$, Cliff undertakes the transform $(U_i^A \otimes U_i^B)^{\dagger}|\Upsilon_i^{AB}\rangle \rightarrow |\Omega_i^{AB}\rangle$ before taking a Bell State Measurement (BSM) to determine the two-bit segment of $S_{ab}$. encoded in the entangled pair. Cliff then immediately broadcasts (classically) the decoded two-bit segment of $S_{ab}$. back to Alice and Bob.<br>In addition: Upon receipt of each matrix pair $U_i^{A2}$, $U_i^D$, Cliff undertakes the transform $(U_i^{A2} \otimes U_i^D)^{\dagger}|\Upsilon_i^{AD}\rangle \rightarrow |\Omega_i^{AD}\rangle$ before taking a Bell State Measurement (BSM) to determine the two-bit segment of $S_{ad}$. encoded in the entangled pair. Cliff then immediately broadcasts (classically) the decoded two-bit segment of $S_{ad}$. back to Alice and Dan. |
| Step 5: | Alice checks that the sequence $S_{ab}$ returned to her by Cliff is correctly decoded and notes the round-trip time for the process. Likewise, Bob does so. Alice and Bob can then compare their round-trip times to Cliff ($2\tau_{AC}$ and $2\tau_{BC}$) to verify consistency with Cliff's publicly reported location $(x_v, y_v)$.<br>In addition: Alice checks that the sequence $S_{ad}$ returned to her by Cliff is correctly decoded and notes the round-trip time for the process. Likewise, Dan does so. Alice and Dan can then compare |

TABLE 2-continued their round-trip times to Cliff ($2\tau_{AC}$ and $2\tau_{DC}$) to verify consistency with Cliff's publicly reported location ($x_v$, $y_v$). Alice, Bob and Dan jointly compare all round trip times ($2\tau_{AC}$, $2\tau_{BC}$ and $2\tau_{DC}$) to verify consistency with Cliff's publicly reported location ($x_v$, $y_v$)

However, perhaps a more elegant solution is the use of multipartite entangled states. For example, consider a Green-Horne-Zeilinger (GHZ) state in which three qubits are maximally entangled, such as $$|S\rangle^{\pm} = \frac{1}{\sqrt{2}}(|000\rangle \pm |111\rangle).$$

Transformation from one GHZ basis state to one of the eight other basis states is achieved by a set of transforms such as $$U_{GHZ} = \begin{Bmatrix} \sigma_z \otimes \sigma_z, I \otimes \sigma_z, i\sigma_y \otimes \sigma_z, \sigma_x \otimes \sigma_z, I \otimes \sigma_x, \sigma_z \otimes \sigma_x, \\ \sigma_x \otimes \sigma_x, i\sigma_y \otimes \sigma_x \end{Bmatrix},$$

where the first (second) operator acts on the first (second) qubit. A step-by-step quantum location verification using such tripartite states proceeds in similar manner to the bipartite protocol. However, for a GHZ state in which three qubits are maximally entangled and shared by three reference stations, say Alice, Bob and Dan, the reference stations need only form one group in order for location verification to proceed. Similarly use of W states (a W state is an entangled state that can leave an entangled smaller-dimensional state behind even after one of the original qubits is lost) can be used instead of GHZ states (see discussion hereinafter on the use of other states).

Clearly, a security threat to the protocol is the potential ability of an adversary who is in possession of an optimal cloning machine, redistributing the set $|\Upsilon_i\rangle$ to other devices. If cloning were exact, the verification test would fail, because the round-trip communication between the devices (needed to decode) would not be required. However, optimal cloning of the set $|\Upsilon_i\rangle$ can be described by the fidelity, $F_c$, between this set and a cloned set. This is known to be upper bounded by $F_c \approx 0.7$ for bipartite entanglement and $F_c \approx 0.6$ for tripartite entanglement. As such, for a series of two-bit messages encoded in N=100 bipartite states, an optimal cloning machine would have a probability of 1 in $10^{16}$ of passing the verification system even though not at the authorized location. For 100 three-bit messages encoded in tripartite states, this decreases to a probability of 1 in $10^{22}$. Arbitrary smaller probabilities are achieved exponentially in N.

A requirement in the use of the disclosed protocol is the rapid implementation of the random unitary matrices, $U_i^r$, at the reference stations. One pragmatic strategy that provides for both a random selection mechanism, and the required non-orthogonal behavior between the states $|\Upsilon_i\rangle$, is to allow the $U_i^r$ to be constructed from random permutations of the Hadamard gate H, and the $\pi/8$ gate T. Since H and T form a universal set for single qubit operations, any random can be constructed by setting $U_i^r = f(H, T)$, where the function $f$ represents random permutations of the H and T gates. Experimental single-use of H and T gates on single-qubit photons (within timescales of nanoseconds) have been achieved by many groups in applications such as teleportation and super-dense coding. Therefore, rapid and repeated use of such implementations should be feasible.

In simulations, permutations of the T and H gates have been explored as a means of producing the random transforms needed to remove the orthogonality of the original basis. A series of random permutations leading to gates of form TTH-THHTTH . . . have been performed, and the average orthogonality of the set $|\Upsilon_i\rangle$ has been measured. Even with gates using only 5 random combinations (e.g. THHTH), the required non-orthogonal properties between the states $|\Upsilon_i\rangle$ was achieved, with the average fidelity between any two states being F ~0.3. Similar fidelities have been found using the random matrix formulation of Eq. (2).

The disclosed quantum protocol outlined herein is aimed at networks in which the quantum channel utilizes fiber and the classical channel utilizes wireless communications. The slower photon velocity through fiber, relative to air, is one reason that necessitates the introduction of random unitary matrices at the reference station. Implementation of the disclosed protocol becomes more straightforward when qubits in the quantum channel are assumed to also move with velocity c. In this case, the requirement for the random unitary transforms at the reference stations is potentially negated. In such a circumstance, a deployment of the one-dimensional verification protocol uses equipment similar to that used in recent experiments on entanglement swapping. In these recent experiments, a BSM is conducted on a series of entangled photons arriving through air from different synchronized sources. Coincidence counting is achieved within the nanosecond range. Determination of all four Bell states in the BSM process, an outcome needed for experimental deployment, has also been recently carried out. The results of such experiments indicate that a quantum location verification implementation, to an accuracy of meters, is currently possible. Any relaxation of our initial assumptions, such as zero processing time, manifests itself in a (determinable) reduction in the accuracy of the location being verified.

FIG. 1 illustrates an example of a physical system 100 for 1D quantum location verification. A picoseconds pulsed laser source 110 pumps a non-linear crystal 120. The crystal 120 may be β-barium-borate, producing polarization-entangled photon pairs via type-II spontaneous parametric down-conversion. These pairs are split. One photon from each pair is sent to a reference station or transceiver at a known location (A) 130 and the corresponding photon from the pair is sent to a reference station or transceiver at another known location (B) 140 via fiber links 124.

The two reference stations 130, 140 (Alice and Bob) are synchronized in time (e.g. via GPS) and possess an unconditionally secure communication channel 142 with each other. This secure link 142 is used to communicate the encoded secret string of bits that is sent by the reference stations 130, 140 to the device or transceiver (C) 170 via quantum channels 150 (e.g., optical fiber links). The reference stations 130, 140 also possess the apparatus required to invoke local transformations on the photons the reference stations 130, 140 possess. After a random transformation has been applied to the photons held by the reference stations 130, 140, each reference station 130, 140 passes a photon from an entangled pair to the device (C) 170. At some time later, the classical information relating to the random transformations adopted by each reference station 130, 140 is transmitted by each reference station 130, 140 to the device (C) 170. The classical messages from the reference stations 130, 140 are transmitted via a wireless channel 160 and are synchronized so as to reach the device (C) 170 simultaneously based on the device (C) 170 being at a claimed location. The device (C) 170 is assumed to have the apparatus or mechanism to carry out transformations on individual photons and to discriminate between the Bells states of entangled pairs.

By using such an apparatus or mechanism, the secret bit string message is decoded and then re-transmitted via the classical wireless channels 160 back to the reference stations. By checking the round trip time between the sending of the classical information relating to the random transformations adopted by each reference station 130, 140 and the receipt from the device (C) 170 of the decoded secret, the location of the device (C) 170 can be confirmed.

Due to the slower velocity of photons in fiber (relative to air) short-term quantum memory is required at the device (C) 170. If the entangled photons are sent also via air and not fiber, the requirement for quantum memory at the device (C) 170 is potentially negated. In this case, the requirement for additional unitary transformations at the reference stations 130, 140 is also potentially negated.

Other variants include additional entanglement resources produced by entangled photon sources, which are then shared between the reference stations 130,140 and the device (C) 170 a priori (i.e. prior to any verification procedure). This allows teleportation (the transfer of a quantum state from one location to another by means of interactions between said quantum state to be teleported, and the additional entanglement resources, followed by classical communication). Such teleportation negates the need for the quantum fiber channels between reference stations 130, 140 and the device (C) 170. Other variants which use labeling of photons, entanglement swapping, and use of additional a priori entangled resources shared between reference stations and the device (C) 170 are described. Labelling of photons can also be used to identify which photons to use for decoding purposes and also to alleviate any issues with errors in measurements or communication errors. In principal, all classical channels could be replaced by additional quantum channels for added security. The key requirement is that transfer over at least some of these additional quantum channels should occur at velocities close to the speed of light.

Even though the disclosed protocol has been discussed under the assumption that all four Bell states can be discriminated in the BSM (Bell state measurement), this is not a requirement. When using linear optics for BSM, only two Bells states can be discriminated (deterministically). In this case our encoding scheme would need to be adjusted to a three message encoding. This has the minor effect of a drop in the channel capacity. There are many mechanisms for decoding (that is determining from the entangled states what classical bit information was originally encoded into the entangled states) beyond BSM, some of which give only partial information or partial discrimination. Again this can be taken into account in the encoding step.

Extension the disclosed system to triplet (and even higher) entangled systems are straightforward. Extension to other entanglement degrees of freedom (beyond polarization) for photons such as momentum and frequency are straightforward. Use of other particles or systems for the carriers of the entanglement, such as electrons, atomic states, atomic ensembles, solid state systems, quantum dots, and d-level qudits, can also be used for quantum verification via straightforward extension of our the protocol described here.

Note that all reference stations and devices are transceivers capable of both quantum and classical communications. In practice, the reference stations could be infrastructure nodes such as base station or access points. They could also be satellites, or other mobile equipment whose location is known. The reference stations could also be other communication transceivers that have had their location authenticated by the quantum location verification protocol described here.

Figure 2:
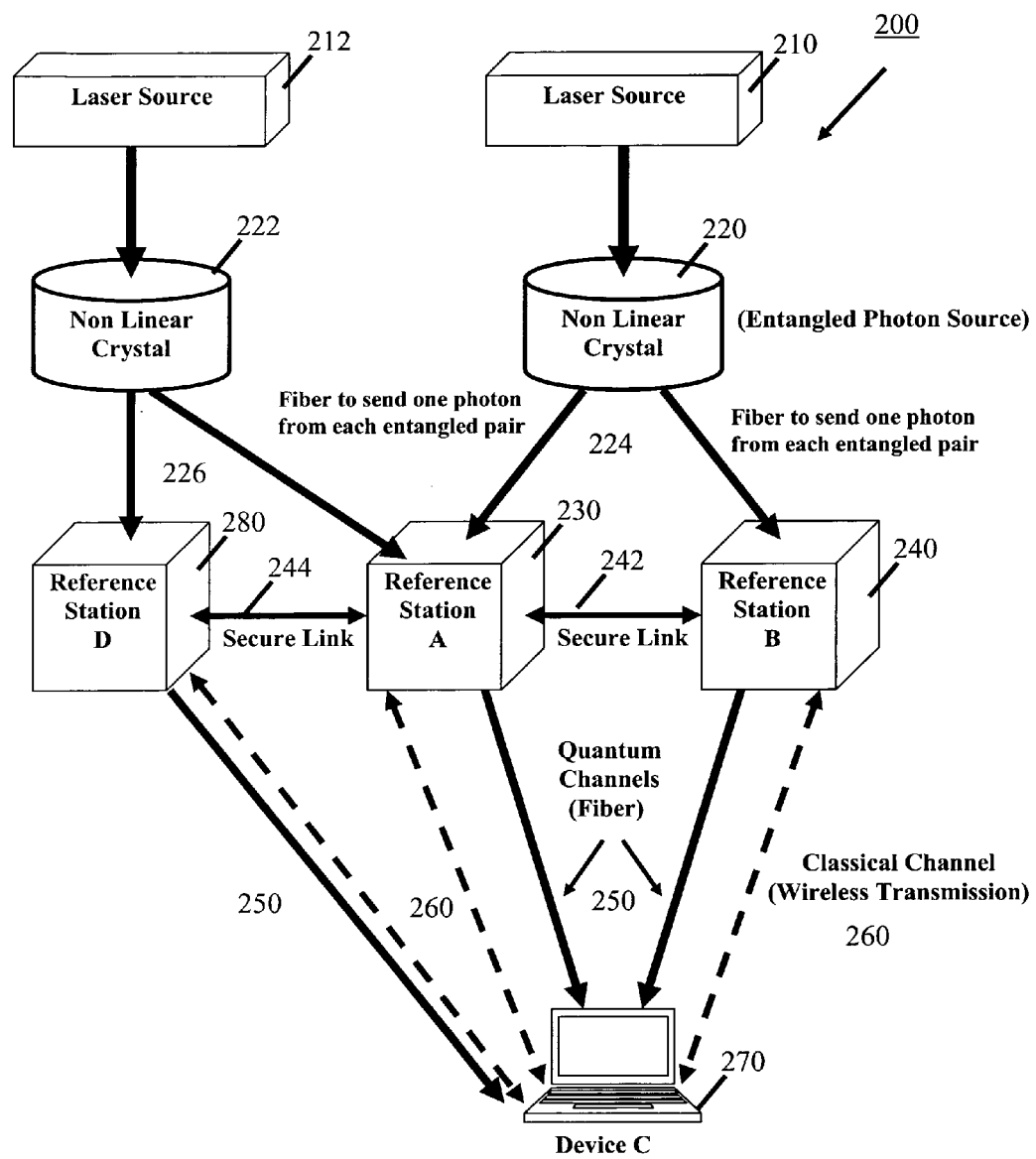
FIG. 2 is a block diagram of a system for verifying the 2D location of a communication transceiver using quantum communication channels with at least three other communication transceivers at known locations.

FIG. 2 is an extension of FIG. 1 illustrating an example of a physical system 200 for 2D quantum location verification. A picoseconds pulsed laser source 210 pumps a non-linear crystal 220. Another picoseconds pulsed laser source 212 pumps another non-linear crystal 222. The crystals 220, 222 may be β-barium-borate, producing polarization-entangled photon pairs via type-II spontaneous parametric down-conversion. These pairs produced by a respective crystal 220, 222 are split. One photon from each pair produced by crystal 220 is sent to a reference station or transceiver at a known location (A) 230 and the corresponding photon from the pair is sent to a reference station or transceiver at another known location (B) 240 via fiber links 224. Likewise, one photon from each pair produced by crystal 222 is sent to the reference station or transceiver at a known location (A) 230 and the corresponding photon from the pair is sent to a reference station or transceiver at another known location (D) 220 via fiber links 226.

The two reference stations 230, 240 (Alice and Bob) are synchronized in time (e.g. via GPS) and possess an unconditionally secure communication channel 242 with each other. Likewise, reference stations 230, 280 (Alice and Dan) are synchronised in this way and possess an unconditionally secure communication channel 244 with each other. Note reference stations 240 and 280 are also synchronized with each other, and share an unconditionally secure communication channel 246 (not shown in FIG. 2) with each other. These secure links 242, 244, 246 are used to communicate the encoded secret string of bits that is sent by the reference stations 230, 240, 280 to the device or transceiver (C) 270 via quantum channels 250 (e.g., optical fiber links). The reference stations 230, 240, 280 also possess the apparatus required to invoke local transformations on the photons the reference stations 230, 240, 280 possess. After a random transformation has been applied to the photons held by the reference stations 230, 240, 280, each reference station 230, 240, 280 passes a photon from an entangled pair to the device (C) 270. At some time later, the classical information relating to the random transformations adopted by each reference station 230, 240, 280 is transmitted by each reference station 230, 240, 280 to the device (C) 270. The classical messages from the reference stations 230, 240, 280 are transmitted via a wireless channel 260 and are synchronized so as to reach the device (C) 270 simultaneously based on the device (C) 270 being at a claimed location. The device (C) 270 is assumed to have the apparatus or mechanism to carry out transformations on individual photons and to discriminate between the Bells states of entangled pairs.

For clarity, an example of one of the variants mentioned above, namely a variant based on entanglement swapping, is now described. Again, for clarity, a one-dimensional location verification is considered in the first instance.

Let Alice share with Cliff a set of N entangled qubit pairs $\Omega_i[AC]$, where the subscript i=1 . . . N labels the entangled pairs. Without loss of generality, the pairs are allowed to be labelled in the order generated by some source. Each of the pairs is described by one of the Bell states $$|\Phi^{\pm}\rangle = \frac{1}{\sqrt{2}}(|00\rangle \pm |11\rangle), |\Psi^{\pm}\rangle = \frac{1}{\sqrt{2}}(|01\rangle \pm |10\rangle),$$

with the first qubit being held by Alice and the second by Cliff. An encoding (00→Φ⁺ etc.) is assumed that is public. Without loss of generality, all pairs are assumed to be initially in the state $|\Phi^+\rangle$. Let Alice also share with Bob a different set of N/2 entangled qubit pairs $\Lambda_j[AB]$, j=1 ... N/2, all of which again can be assumed to be initially in the state $|\Phi^+\rangle$.

The entanglement-swapping protocol proceeds as outlined in Table 3.

TABLE 3

| | |
|---|---|
| Step 1: | Alice initiates an entanglement swapping procedure to form a new set $\Gamma_j[BC]$ of N/2 entangled pairs between Bob and Cliff. She achieves this by randomly selecting one of her local qubits from the pairs $\Omega_i[AC]$, combining this with one of her local qubits sequentially chosen from the pairs $\Lambda_j[AB]$, and conducting a Bell State Measurement (BSM) on the two qubits. These qubits are not selected again for BSM. Alice repeats this process until all of her local qubits from the pairs $\Lambda_j[AB]$ have undergone BSM. At this point Bob shares a new set $\Gamma_j[BC]$ of N/2 entangled pairs with Cliff, and Alice shares a reduced set $\Omega_{j'}[AC]$ of N/2 entangled pairs with Cliff (j' = 1 ... N/2). The sets are labelled with the different subscripts i, j, j' to illustrate the following points. Cliff is in possession of N qubits, which remain labelled with the index i. Cliff is unaware which reference station (Alice or Bob) each of the qubits in Cliff's possession is entangled with. At this point, only Alice knows the entanglement pairing of Cliff's qubits (j → i, j' → i). |
| Step 2: | Alice communicates with Bob via their secured channel, and informs Bob of two facts related to each of the local qubits Bob possesses from the pairs $\Gamma_j[BC]$. Bob is informed of the BSM result relevant to each qubit, and the (j → i) mapping. |
| Step 3: | Alice generates a random binary sequence $S_a$ of length K bits (K < N), and encodes this sequence into the local qubits Alice possesses from the pairs $\Omega_{j'}[AC]$. The encoding is achieved via superdense coding in which two classical bits are encoded using local unitary operators as described by<br>$I|\Phi^+\rangle=|\Phi^+\rangle$, $\sigma_x|\Phi^+\rangle=|\Psi^+\rangle$, $i\sigma_y|\Phi^+\rangle=|\Psi^-\rangle$, and<br>$\sigma_z|\Phi^+\rangle=|\Phi^-\rangle$, where the σ's are the usual Pauli operators. |
| Step 4: | Bob generates a random binary sequence $S_b$ of length K bits (K < N), and using unitary operators encodes this sequence into the local qubits Bob possesses from the pairs $\Gamma_j[BC]$. This is achieved using Bob's knowledge of Alice's BSM outcomes. |
| Step 5: | Alice sends one of Alice's encoded qubits from the set $\Omega_{j'}[AC]$ to Cliff. Simultaneously, using the classical channel, Alice identifies to Cliff which of Cliff's local qubits is entangled with the incoming qubit Alice has sent (Alice informs Cliff of the label i). Concurrently, Bob carries out the same procedure as Alice using Bob's local qubits from the pairs $\Gamma_j[BC]$. |
| Step 6: | Cliff combines any incoming qubit Cliff receives with Cliff's local qubit labelled i and performs a BSM in order to decode two bits of information. Cliff then immediately communicates classically to the sender of the qubit informing the sender of the two bits Cliff decoded. |
| Step 7: | Alice checks that the sequence returned to her by Cliff is correctly decoded and notes the round-trip time for the process. Likewise Bob does so. Alice and Bob can then compare their round-trip times to Cliff $2\tau_{AC}$ and $2\tau_{BC}$ to verify consistency with Cliff's publicly reported location $(x_v, y_v)$. |

The use of additional entanglement resources between a third reference stations, say Dan, and one of Alice or Bob, leads to a two dimensional version of the quantum location verification algorithm of Table 3. In the two dimensional version of this protocol, after the appropriate entanglement swapping procedures, sets of entangled pairs are shared between Cliff and each of the reference stations. That is, Cliff shares a set of entangled pairs between Cliff and Alice, another set between Cliff and Bob, and another set between Cliff and Dan. Alice, Bob and Dan communicate between themselves (in a secure manner) so as to inform each other which of Cliff's particles are entangled with the particles they hold. At this point Cliff does not know which particle at which reference station is entangled with each of the particles Cliff holds. Alice, Bob and Dan then encode their own random bit sequence in the entangled set of particles Alice, Bob and Dan share with Cliff, before Alice, Bob and Dan each send their set of entangled particles to Cliff. At some time later, Alice, Bob and Dan send by classical means, the label information which lets Cliff identify which particle is entangled with which particle. This classical information allows Cliff to decode the random bit sequences encoded by Alice, Bob and Dan. Upon decoding a qubit, Cliff must immediately broadcast classically the portion of the random bit sequences Cliff has decoded. By checking, the round trip time between sending and receiving of the random bit sequences, Alice, Bob and Dan can verify Cliff's location.

In this entanglement-swapping protocol, random unitary matrices are not required. Simple variations of this last protocol can be obtained by adding additional entanglement resources and additional entanglement swapping.

For example, a modified verification protocol that uses entanglement swapping can be constructed that entirely negates the requirement for direct transfer of qubits between the reference stations and the device. Location verification would then be possible in a satellite-to-device communications system, provided the satellite and the device shared an entangled resource a-priori. The use of additional random unitary matrices may be needed in some circumstances. One scenario where a entanglement swapping protocol (such as that just described) could be deployed is in a location authentication system in which only classical communications exist between reference stations and the device to be authenticated. Although quantum entanglement would still underpin this system (the a priori entanglement forms an a priori quantum channel), reference stations, such as satellites, could authenticate (using a classical wireless channel) a mobile terrestrial device without the need to directly transfer quantum state information to the device.

Further, it is not difficult to envisage a 'bootstrapping' protocol that uses any verified device as an additional reference station for subsequent location verification. It is also possible that relative location could be verified as opposed to absolute location verification. Additional security could be added by encrypting all classical communications between reference stations and devices using QKD or other quantum encryption techniques. The other device may be the communication transceiver at the location to be verified, for example. Such additional security could simplify some aspects of quantum location verification protocols at the cost of complicating other aspects of the protocols.

Further Embodiments

In other embodiments of the invention, particles capable of having or containing quantum state information may be practiced. Entangled particles are preferable, but other particles may be practiced. Thus, the particles from different reference stations (i.e., a communications transceiver at a known location) might not be entangled. For example, one photon and one qubit might be practiced, where the photon is used to unlock the qubit. Examples of relevant physical implementations include photons, electrons, nuclei. Thus, there is provided a method of verifying the location of a communication transceiver using quantum communication channels using particles of a quantum system. Communications transceivers at different known locations having a secure channel therebetween are used to verify the location of the communication transceiver at a location to be verified using particles transmitted using the quantum communication channels. As noted hereinbefore, deterministic discrimination amongst the encoded states must be possible, within a pre-described time bound at only one location. This can be achieved if the $2^k$ states that encode the k-bit messages are made non-orthogonal by the introduction of an additional local unitary transformation at each reference station.

Because of the non-orthogonal nature of the encoding, cloning all the quantum states that are used to encode the messages is impossible. For the no-cloning paradigm to be viable, not all the quantum states needed for encoding need be in an unknown superposition of possible basis states. Further, for the no-cloning paradigm to be viable, not all particles used to carry the states need be part of a larger entangled quantum system. However, entangled systems are preferred since entangled systems are more difficult to clone (i.e. attempts at cloning produce lower fidelity copies).

Further Protocol

A further embodiment of the invention provides a method that is a variant of the protocol described hereinbefore, which delivers an enhanced level of security. Information required to spoof the protocol is not stored classically and thus is immune to any side-channel attack. The system is therefore unconditionally secure even when an adversary can access all known information stored on devices not held by the adversary.

The protocol described hereinbefore is unconditionally secure given the assumption that reference stations (i.e., communications transceivers at different known locations) used to derive the location verification are secured in that the reference stations are totally inaccessible to an adversary; side channel attack on the reference stations (or other devices not held by an adversary) are assumed to not be possible. Side channels attacks (or information leakage attacks), are based on information gained from the physical implementation of a system. Examples of side channels are electromagnetic radiation, heat dissipation, power consumption in the device, or temporal execution of the security algorithm.

If an adversary is allowed to possess infinite physical and computational recourses, however, the scenario is considered where he has devised methods to access and fully read, via some known or unknown side channels, the information stored in the memories of reference stations or other devices not held by the adversary. This access is assumed to be achieved in a manner that is totally undetectable to the system. A technology that allows an adversary to access in an undetectable manner all possible information in a reference station or device not held by the adversary is referred to as 'Undetectable Read Technology' (URT), which assumed to be bound only by the laws of physics.

In this embodiment of the invention, location verification remains unconditionally secure even when an adversary possesses URT. A point underlying this further protocol is that although information stored classically can be accessed with URT, information that is hidden by Nature, in the form of quantum particles, cannot. Indeed, in this embodiment of the invention, even the system at large does not know the correct coded information (required for location verification) until the device to be located makes an actual quantum measurement.

For clarity of presentation only, the protocol is specified for one dimensional location verification—verification for multi-dimensional space follows in a straightforward manner (more complex set-ups are discussed hereinafter). Consider some reference stations at publicly known locations, and a device that is not a reference station (Cliff) that is to be verified at a (e.g. publicly known) location $(x_v, y_v)$. Processing times, such as those due to local quantum measurements, are assumed to be negligible. Further, the reference stations are assumed to be authenticated, be synchronized perfectly in time, and share secure communication channels between each other via quantum key distribution (QKD). The URT is assumed to be available to the adversary, who also has an infinite number of devices. For clarity, the transfer of a particle of a quantum system is assumed to occur in a timescale given by the Euclidean distance divided by c, the speed of light in a vacuum. This latter transfer can occur either by direct transfer of a particle of a quantum system (where the medium in which the qubit travels allows for light speed communications), or via use of quantum teleportation using a priori quantum entanglement between a sender and a receiver.

A geometrical constraint for one-dimensional location verification is that the device to be located must lie between reference stations Alice and Bob. That is, $\tau_{AC}+\tau_{BC}=\tau_{AB}$, where $\tau_{AC}(\tau_{BC})$ is the light travel time between Alice (Bob) and Cliff, and where $\tau_{AB}$ is the light travel time between Alice and Bob.

Let Alice initially possess a set $|\Omega_i^{12}\rangle$ of N maximally entangled qubit pairs, where the subscript i=1 ... N labels the entangled pairs, and the qubits of each pair are labeled 1 and 2. Let Bob initially possess a set $|\Upsilon_j^{34}\rangle$ of N maximally entangled qubit pairs, where the subscript j=1 ... N labels the entangled pairs, and the qubits of each pair are labeled 3 and 4.

Without loss of generality, let each of the qubit pairs held by Alice be described by one of the Bell states $$|\Phi^{\pm}\rangle = \frac{1}{\sqrt{2}}(|00\rangle \pm |11\rangle), |\Psi^{\pm}\rangle = \frac{1}{\sqrt{2}}(|01\rangle \pm |10\rangle).$$

Similarly for Bob, the labels 1, 2 are swapped with 3, 4, respectively. Again, without loss of generality, all qubit pairs held by Alice and all qubit pairs held by Bob are assumed to all be initially in the state $|\Psi^-\rangle$. More explicitly, for Alice we have:

$$|\Psi^-\rangle_{12} = \frac{1}{\sqrt{2}}(|0\rangle_1|1\rangle_2 - |1\rangle_1|0\rangle_2)$$

and for Bob we have:

$$|\Psi^-\rangle_{34} = \frac{1}{\sqrt{2}}(|0\rangle_3|1\rangle_4 - |1\rangle_3|0\rangle_4).$$

Consider N=1 and the scenario where qubit 2 held by Alice and qubit 3 held by Bob are transmitted to a third device, Cliff. The state of all four qubits 1-4 prior to any measurement by Cliff can be written, $|\Upsilon\rangle_{1234} = |\Psi^-\rangle_{12} \otimes |\Psi^-\rangle_{34}$, which can be written:

$$|\Upsilon\rangle_{1234} = \frac{1}{2}\begin{bmatrix} |\Psi^+\rangle_{23}|\Psi^+\rangle_{14} - |\Psi^-\rangle_{23}|\Psi^-\rangle_{14} \\ -|\Phi^+\rangle_{23}|\Phi^+\rangle_{14}|\Phi^-\rangle_{23}|\Phi^-\rangle_{14} \end{bmatrix}.$$

A Bell state measurement on qubits 2 and 3 at Cliff project the qubits 2 and 3 into one of the Bell states, $|\Phi^+\rangle_{23}$, $|\Phi^-\rangle_{23}$, $|\Psi^+\rangle_{23}$ or $|\Psi^-\rangle_{23}$ with an equal probability of 0.25. This measurement (i.e. which state found) at Cliff is referred to as $R_C$. This result can be encoded classically in two classical bits. Corresponding to each possible outcome, the Bell state measurement on qubits 2 and 3 at Cliff also project the qubits 1 and 4 into one of the Bell states $|\Phi^+\rangle_{14}$, $|\Phi^-\rangle_{14}$, $|\Psi^+\rangle_{14}$ or $|\Psi^-\rangle_{14}$ with an equal probability of 0.25.

Step-by-Step Exposition of Protocol

Figure 3:
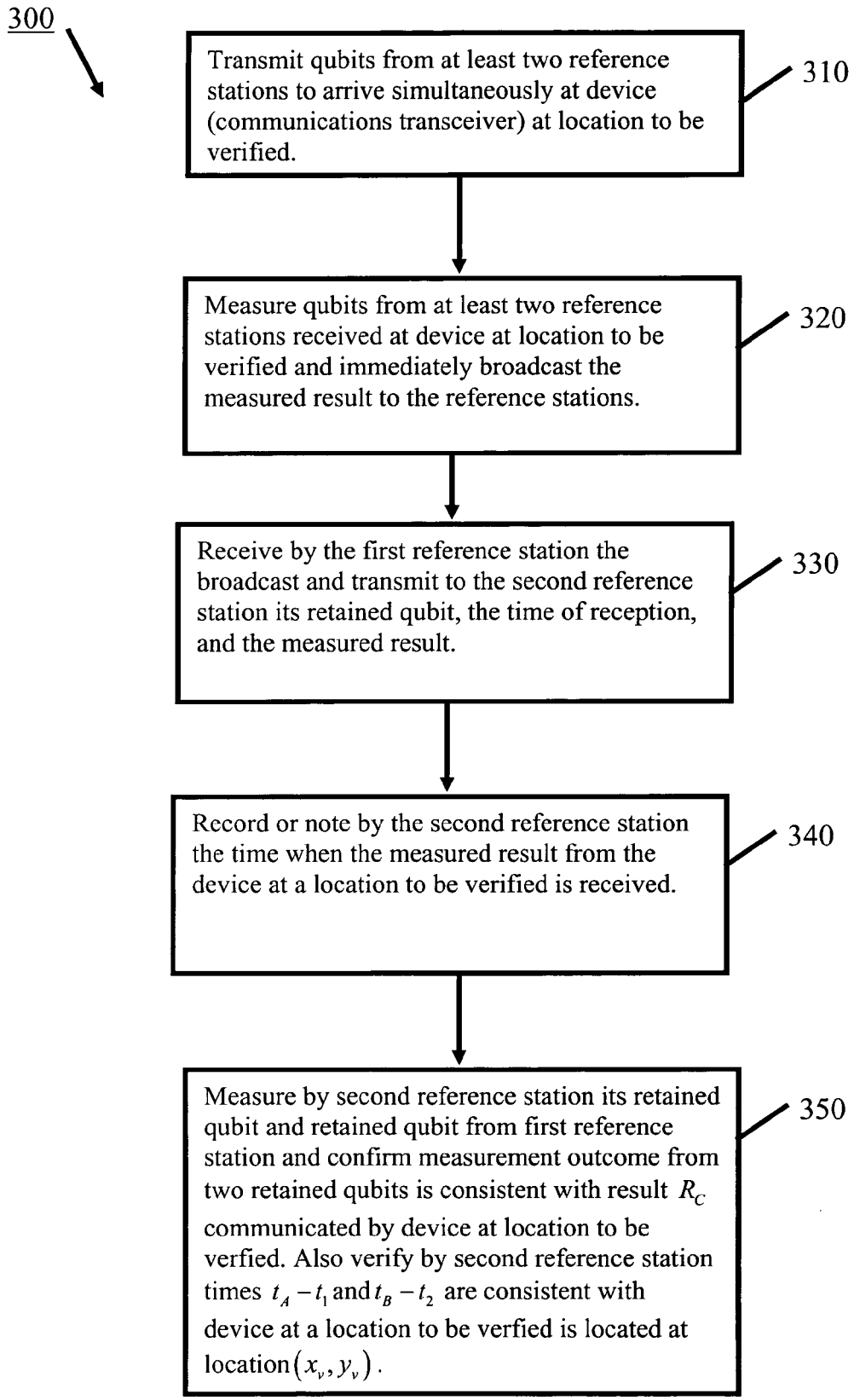
FIG. 3 is a flow diagram of a method of verifying the 1D location of a communication transceiver using quantum communication channels with two other communication transceivers at known locations in accordance with another embodiment of the invention.

FIG. 3 is a flow diagram of a method 300 of verifying the location of a device (Cliff). In step 310, qubits are transmitted from at least two reference stations to arrive simultaneously at device at location to be verified. The qubits may be transmitted synchronously. For ease of description, the method 300 is described with reference to qubits, but the method is more general in that particles of a quantum system can be practiced. A particle having quantum states for storing information may be practiced. Each transmitted particle is one of a pair of particles of the quantum system related to the quantum system, i.e. entangled particles. Each reference station or device retains its other particle of the pair of particles. At time $t_1$, Alice transmits her qubit 2 to Cliff, and at time $t_2$ Bob transmits his qubit 3 to Cliff. The transmissions are synchronized so that qubits 2 and 3 arrive at Cliff at time $t_3$, simultaneously. Qubits 1 and 4 are retained by Alice and Bob, respectively. In step 320, device at location to be verified measures received qubits from at least two stations and immediately broadcasts the measured result to the reference devices or stations. Upon receipt of the qubits 2 and 3 sent by Alice and Bob, Cliff immediately undertakes a Bell state measurement and immediately broadcasts the result $R_C$, encoded in two classical bits, to Alice and Bob.

In step 330, the first reference station or device receives the broadcast and transmits to the second reference station or devices its retained qubit, the time of receipt, and the measured result. For example, Bob notes the time $t_B$ when the classically broadcast message from Cliff is received by him. Bob immediately transmits to Alice qubit 4, the value $t_B$, and the result $R_C$. In step 340, the second reference station or device records or otherwise notes the time when the measured result from the device at a location to be verified is received. Thus, for example, Alice notes the time $t_A$ when the classically broadcast result $R_C$ from Cliff is received by her. In step 350, on receipt of the retained qubit from the first reference station or device and the measurement from the device at a location to be verified, the second reference station measures its retained qubit and the retained qubit from the first reference station and confirms that the measurement outcome from the two retained qubits is consistent with result $R_C$ communicated by the device at a location to be verified (and the reference station). The second reference station also verifies the times $t_A$-$t_1$ and $t_B$-$t_2$ are consistent with the device at a location to be verified is located at the location $(x_v, y_v)$. Thus, on receipt of qubit 4 from Bob and $R_C$ from Cliff, Alice may undertake a Bell state measurement on qubits 1 and 4 and confirms that the Bell state measurement outcome she finds is consistent with result $R_C$ communicated by Cliff (and Bob). Alice also verifies the times $t_A$-$t_1$ and $t_B$-$t_2$ are consistent with Cliff being located at the location $(x_v, y_v)$.

Assuming all measurements are consistent, the device (Cliff) can be unconditionally verified at the location $(x_v, y_v)$ at a time of $\tau_{AB}$ ago. The steps 310-350 can be repeated (either sequentially or in parallel) for all N qubit pairs held by the second reference station (Alice) and all N qubit pairs held by the first reference station (Bob). The probability of spoofing the system is set to an arbitrarily small value by increasing the value of N. In this protocol, there are no instances in time where an adversary can obtain all information in a timescale that would allow the adversary to spoof the system, even when the adversary possesses URT. All other variants on this, and discussions of practical location errors etc, follow a similar discussion to that given hereinbefore.

The measuring step performed by the communications transceiver may be performed immediately upon receipt of the transmitted particles of the quantum system and may involve a Bell state measurement of the particles of the quantum system.

The measured result is preferably broadcast immediately and may be classically encoded.

The retained particles of the quantum system are measured by the other reference station. Furthermore, the retained particles of the quantum system are measured by the other reference station on receipt of the retained particle of the quantum system from the one reference station and the measured result from the communications receiver, The method may comprise the step of verifying the times $t_A$-$t_1$ and $t_B$-$t_2$ from two reference devices are consistent with the communications transceiver being located at a location.

One or more of the particles of the quantum system is a qubit or qudit.

At least one particle is entangled with another particle.

At least three reference stations may be used.

The measuring step performed by the communications transceiver at the location to be verified may be performed immediately upon receipt of the transmitted particles.

In the example provided hereinbefore, the authenticated communications transceiver is the second reference station (Alice). At least three reference stations may be used and the measuring step may involve a projection onto a GHZ state or a projection onto another multipartite state of the particles of the quantum system (a measurement of an operator having eigenstates that are GHZ states or eigenstates that are some other multipartite states).

A device may generate entangled particles and provide the entangled particles to the reference stations.

Figure 4A:
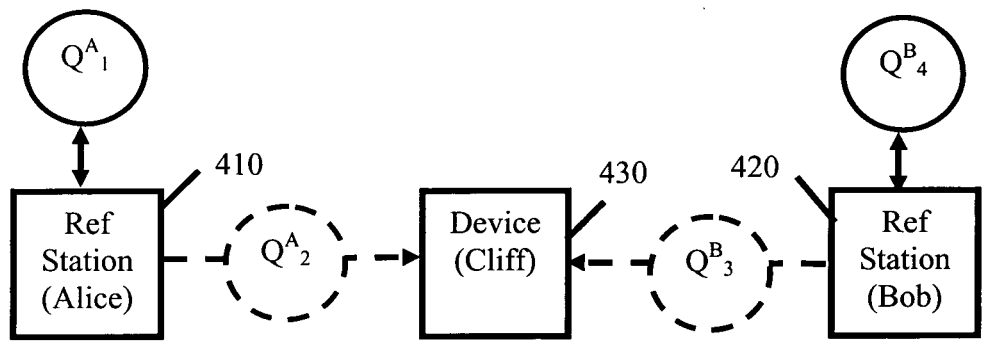
FIGS. 4A, 4B and 4C are block diagrams of the communication transceiver using quantum communication channels with the two other communication transceivers at known locations in accordance with the method of FIG. 3.
Figure 4B:
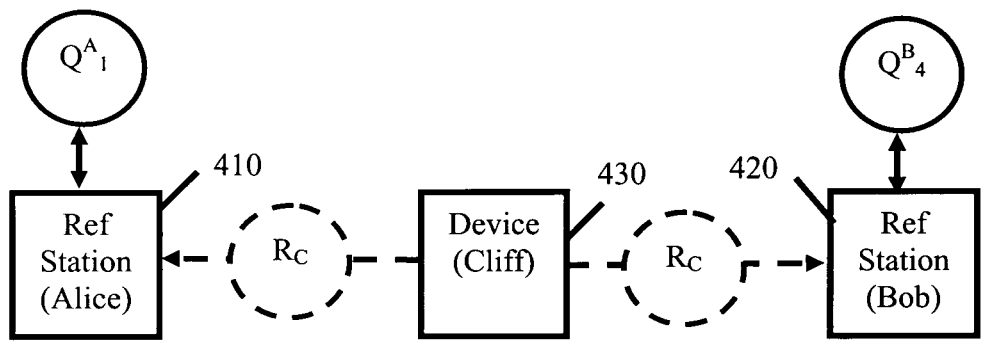
Figure 4C:
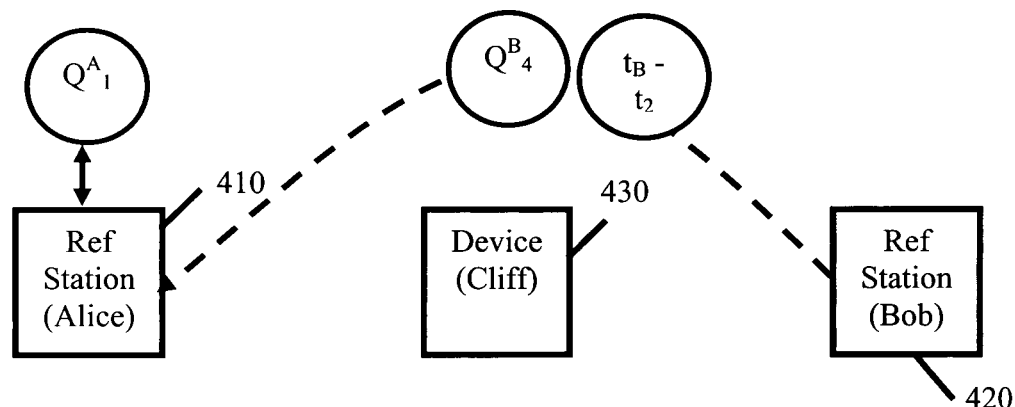

The process 300 of FIG. 3 is depicted graphically in FIGS. 4A to 4C for a one-dimensional example. In this system, no classical information is stored in the reference stations or devices. In FIG. 4A, there are two reference stations 410, 420 (Alice and Bob) with the device 430 (Cliff) at a location to be verified, here shown between the two reference stations. The reference station 410 (Alice) has two entangled qubits $Q^A_1$ and $Q^A_2$, and the reference station 420 (Bob) has two entangled qubits $Q^B_3$ and $Q^B_4$. These pairs of qubits are generated dynamically. The qubits $Q^A_2$ and $Q^B_3$ are transmitted from the two reference devices 410 and 420 to arrive simultaneously at the device 430. The qubits may be transmitted synchronously. The transmitted qubits $Q^A_2$ and $Q^B_3$ are not entangled with each other at this point. The qubits $Q^A_2$ and $Q^B_3$ become entangled after measurement by Cliff. In FIG. 4B, the device 430 measures the received qubits $Q^A_2$ and $Q^B_3$ from the reference stations 410 and 420 and immediately broadcasts the measured result $R_C$ to the reference devices or stations 410 and 420. The retained qubits are consequently entangled due to entanglement swapping. The reference station or device 420 receives the broadcast in FIG. 4B and, in FIG. 4C, transmits to the other reference station or device 410 its retained qubit, the time of receipt ($t_B$-$t_2$), and the measured result. The reference station or device 410 notes the time when the measured result from the device 430 is received. The reference station 410 measures its retained qubit $Q^A_1$ and the retained qubit $Q^B_4$ from the reference station 420 and confirms that the measurement outcome from the two retained qubits is consistent with result Rc communicated by the device 430. The reference station 410 verifies the times $t_A$-$t_1$ and $t_B$-$t_2$ are consistent with device 430 being located at the location ($x_v$, $y_v$).

While reference station 410 is depicted as doing the verification in FIG. 4C, the other reference station 420 could have done so. Still further, a third reference station (not shown) might perform the verification in FIG. 4C.

Measurements have been expressly described as being Bell state measurements. However, other types of "measurements" may be practiced. A single measurement or a sequence of measurements may be performed. Examples of other quantum measurements include a GHZ state measurement or other multipartite state measurement. For example, one type of measurement would be correlation measurements on the qubits, e.g. cross-correlation of polarisations. All measurements are done quickly, on the order of nanoseconds.

In summary, pairs of qubits are used by the reference stations. One qubit of each pair is synchronously transmitted by the respective reference station to the device (communications transceiver) at the location to be verified. That device measures information extracted from the two transmitted qubits and broadcasts the measurement result back to the reference stations. The roundtrip time between the device and the respective reference station can be determined. Information from the other retained particles can be measured. The information obtained in the broadcast measured result is also used. The time elapsed between sending the transmitted qubits and receiving the broadcast measured result is used in the verification process, as is the information obtained from measuring the retained qubits.

Variations of the location verification protocol described hereinbefore are possible. Such variations may include the use of a larger (more than two) group of particles of a quantum system. For example, such a group of particles may initially be held at each reference station, and each reference station may then send a subset of the group to the device at a location that is to be verified. A measurement, or a sequence of measurements, could then be taken at the device whose location is to be verified, and this result (or results) broadcast to the reference stations. Another variation is that the groups of particles forming the quantum systems are initially distributed between the reference stations, or between the reference stations and the device to be located. A subset of the reference stations may also be used in this context.

Variations of the location verification protocol described hereinbefore may also include different types of quantum measurements or operations (or a sequence of quantum measurements or operations) on the particles of the system. For example, simultaneous measurements of compatible (or incompatible) observables may be undertaken on the particles of the quantum system held at the reference stations or device at various times during the verification process. Also, correlation measurements may be undertaken on the particles of the quantum system at various times during the verification process. Such quantum measurements (or sequences of such measurements) can be used to probe non-local features of the quantum system, or the contextuality (e.g. a value that is dependent on the order of certain quantum measurements on the particles of the system). Such features can be used to construct location verification protocols that add further device-independent security to location verification protocols. Also, such features can be used to construct location verification protocols that add further device-independent security to location verification protocols having security that does not rest on any assumptions of quantum mechanics, but rather solely on the assumption that information transfer cannot be superluminal (no-signalling). Further straightforward variants of device-independent location verification protocols, include the use of additional entanglement swapping, the use of higher dimensional quantum states, the use of hyper-entangled states, the use of additional teleportation, the use of additional authenticated servers and reference stations, the use of additional classical or quantum channels, and the use of classical channels that are encrypted with QKD. The use of different and larger multipartite states is also possible. For example, with more than two reference stations, a projection measurement at Cliff onto the basis of a larger multipartite entangled state is possible. A specific example of this is the use of 3 pairs of entangled qubits at three reference stations, where one qubit from each pair is used in a projection measurement onto the GHZ basis at Cliff Finally, the protocol can be aborted at any time should the error rates of any of the communication channels be deemed too large.

While a specific protocol is given in FIGS. 3 and 4, the embodiments of the invention are of more general application and scope. In an embodiment of the invention, a method of verifying the location of a communications transceiver using quantum communication channels is provided. The method comprises using communications transceivers at different known locations having a secure channel therebetween to verify the location of the communication transceiver at a location to be verified using particles transmitted using the quantum communication channels. The particles may be transmitted by direct transfer of the particles, or by teleporting the particles. The method utilises state encoding and deterministically discriminates amongst encoded states within a pre-described time bound at only one location. The method may encode a k-bit message by making the $2^k$ states of the particles non-orthogonal using an additional local unitary transformation at each of the communications transceivers at different known locations. The method may comprise encrypting classical communications between the communications transceivers at different known locations using QKD or another quantum encryption technique. The other device may be the communication transceiver at the location to be verified, for example.

In accordance with another embodiment of the invention, there is provided a method verifying the location of a communications transceiver using quantum communication channels. The method comprises: transmitting using quantum communications channels from each of at least two communications transceivers at different known locations at least one particle of a quantum system to arrive simultaneously with other transmitted particles at the communication transceiver at a location to be verified, each transmitted particle being one of at least two particles of each quantum system; retaining at least one other particle of the respective quantum system by each of the communications transceivers at different known locations; receiving by each of the communications transceivers at different known locations at least one measured result immediately broadcast by the communication transceiver at a location to be verified; calculating a time of receipt by each of the communications transceivers at different known locations, the time of receipt being the round trip time of transmitting the particle of the respective quantum system and receipt of the broadcast measured result; transmitting using quantum communications channels by each of the communications transceivers at different known locations the retained particle to the authenticated communication transceiver; measuring by the authenticated communication transceiver the transmitted retained particles from the communications transceivers at different known locations; and determining whether or not the communication transceiver at a location to be verified is at the location purported to be the location of the communication transceiver at a location to be verified dependent upon the time of receipt by each of the communications transceivers at different known locations and upon the measurement result for the retained particles and the broadcast measured result received by the communications transceivers at different known locations.

The method may comprise transmitting by each of the communications transceivers at different known locations the time of receipt of the broadcast measured result to the authenticated communication transceiver.

The method may comprise transmitting by each of the communications transceivers at different known locations the broadcast measured result received by the communications transceivers at different known locations to an authenticated communication transceiver.

The determining step may be implemented by an authenticated communications transceiver.

The method may comprise: receiving by the communication transceiver at the location to be verified the transmitted particles of the quantum systems from the communications transceivers at different known locations; measuring immediately by the communication transceiver at the location to be verified the received particles of the quantum systems; and broadcasting immediately by the communication transceiver at the location to be verified at least one measured result to the communications transceivers at different known locations.

Each measuring step may be implemented using one type of measurement for one group of particles and at least one other type of measurement for another group of particles.

The at least one measured result may be classically encoded.

The method may comprise the step of verifying the receipt times from the communications transceivers at different known locations are consistent with the communications transceiver being located at a location.

The method steps may be repeated for all N quantum systems held by each of the communications transceivers at different known locations.

One or more particles of the quantum systems may be a qubit or qudit.

At least one particle may be entangled with another particle.

One or more of the measuring steps may involve a projection onto a GHZ state, a projection onto another multipartite state of the particles of the quantum system, or a Bell state measurement of the particles of the quantum systems.

A device may generate the quantum systems and provides the quantum systems to the communications transceivers at different known locations.

The authenticated communications transceiver may be one of the communications transceivers at different known locations.

One or more of the communications transceivers at different known locations may be a reference station.

One of the communications transceivers at different known locations that is different to the authenticated communications transceiver may measure the retained particles.

The communication transceiver at the location to be verified may generate immediately several measured results.

The communication transceiver at the location to be verified may broadcast immediately the plurality of measured results to the communications transceivers at different known locations.

The particles may be transmitted by direct transfer of the particles, or by teleporting the particles.

The method may comprise state encoding and deterministically discriminating amongst encoded states within a pre-described time bound at only one location.

The method may comprise encrypting classical communications between the communications transceivers at different known locations using QKD or another quantum encryption technique. The other device may be the communication transceiver at the location to be verified, for example.

Use of Dependent Information

For the purpose of clarity, the discussion of location verification thus far has been in the context of simple set-ups. The expression "set-ups" means herein the implementation of those parts of a protocol left open to the engineer deploying the system (a common feature in most communication protocols), the setting of some of the parameters or functions used in a protocol, or the use of some additional functionality. More complex set-ups can be practiced that allow a trade-off between expansions of the threat model (e.g., potential attack scenarios) against simplicity of deployment. In the protocols already given, the detailed method on how to communicate the classical information to be sent by reference stations forms part of the set-up. Such communication may be practiced using dependent information sent by the reference stations. As used herein, dependent information means information required for any specific step of a location verification protocol that can only be constructed upon receipt of messages from at least two communications transceivers at different known locations in a manner that makes spoofing of the location verification system impossible. For example, when using dependent information, the information contained solely within one specific message cannot be used to implement part of a required step with the remaining part of the step being implemented from information contained solely in a second separate message.

In general, dependent information can be used to construct any measurement operator (or decoding instructions) required at the communication transceiver at the location to be verified, in a manner that the operator (or instructions) cannot be constructed until different messages sent by different reference stations have been received by the communication transceiver at the location to be verified. A specific manifestation of the use of dependent information is where the values of the matrix elements to be applied to a rotation of a specific qubit, prior to any measurement operation by the communication transceiver at the location to be verified, can be delivered in a manner in which the matrix elements can only be determined by combining the classical messages sent by multiple reference stations. The coding of the dependent information being sent from different reference stations can be done using code strings (block lengths) of arbitrary size, with this size being different at different reference stations.

Further dependency can be added by linking the matrix information related to one qubit (or quantum system), to the outcome of a measurement applied to another qubit (or quantum system). There are also many means to communicate the required rotation information, such as a sequence of specific apparatus events (e.g. laser pulses) to be applied at certain times to certain qubits. This messaging can again be made dependent in that the precise nature of the events and their proper sequencing is only obtained when multiple dependent classical messages are received (from multiple reference stations) at the communication transceiver at the location to be verified. All messaging forms related to the manipulation of quantum information held in a quantum system can ultimately be mapped to a unitary matrix (or matrices) applied to a quantum state (or states) related to that quantum system.

To provide a specific example of the use of dependent information, consider the application of dependent information to the first protocol explicitly described hereinbefore, namely that of Table I. When Alice and Bob communicate the random matrices $U_i^A$ and $U_i^B$ (where i labels the multipartite state), Alice and Bob can do so in a dependent manner as described hereinafter. Let the information pertaining to $U_i^A$ and $U_i^B$ be described via $\alpha_i^A, \beta_i^A, \gamma_i^A$ and $\alpha_i^B, \beta_i^B, \gamma_i^B$, respectively (see Equation 2). Following the construction of $U_i^A$ and $U_i^B$ by Alice and Bob for each of the qubits held by Alice and Bob, the reference stations (Alice and Bob) communicate with each other and encode each of the parameters dependently. For example, consider the qubits of the first multipartite state sent. $\alpha_1^A = g_1^A(\hat{\alpha}_1^A \hat{\beta}_1^A, \hat{\gamma}_1^A, \hat{\alpha}_1^B, \hat{\beta}_1^B, \hat{\gamma}_1^B), \alpha_1^B = g_1^B(\hat{\alpha}_1^A \hat{\beta}_1^A, \hat{\gamma}_1^A, \hat{\alpha}_1^B, \hat{\beta}_1^B, \hat{\gamma}_1^B)$ (and so forth), where $g_1^A$ and $g_1^B$ are generic functions and $\hat{\alpha}_1^A, \hat{\beta}_1^A, \hat{\gamma}_1^A, \hat{\alpha}_1^B, \hat{\beta}_1^B, \hat{\gamma}_1^B$ are the input variables for the functions sent by the reference station (each indicated by the superscript—A for Alice and B for Bob) to the device at the location to be verified. A generic function may possess non-linear dependency on the inputs and may be non-invertible. Not all inputs listed need be used. The specific form for the generic functions may be set a priori in some cases. The generic functions may also be communicated directly by the reference stations to the device at the location to be verified. The information pertaining to the other qubits sent by Alice and Bob may be made dependent even further by making such information dependent on the outcomes of measurements on other qubits received by the device at the location to be verified. The time difference either between arrivals of matrix information related to each qubit or between qubit arrivals along with measurement processing time of each qubit, can in principle be made arbitrarily small, so as to have negligible impact on the error of the verification position. For example, if $\omega_i$ is allowed to be a number that maps to a specific one of the orthogonal basis states of the $i^{th}$ multipartite state, then $\alpha_2^A = g_2^A(\omega_1, \hat{\alpha}_2^A, \hat{\beta}_2^A, \hat{\gamma}_2^A, \hat{\alpha}_2^B, \hat{\beta}_2^B, \hat{\gamma}_1^B)$, where $g_2^A$ is a new generic function. Similar constructions for other matrix parameters are available, as is deeper dependency on other qubits (e.g. dependency on an arbitrary large number of earlier qubit measurement outcomes) are available. Multiple $\omega_i$ per measurement are also available. Measurement operators relating to measurement of a subsystem of a larger quantum system can be practiced. Decoy qubits, with additional instructions (dependently sent) stating the decoy qubits should not be used in any information extraction or measurement process, is one method of forming a subsystem measurement process.

Further extensions in the use of dependent information can be made. Construction of the measurement operator itself can be delivered in a similar manner to that described hereinbefore. A specific measurement to be used on a specific qubit can be made dependent on previous measurement outcomes. Likewise, the functions $g_i^{A,B}$ ... can be delivered to the device at the location to be verified using dependent information as outlined hereinbefore. All dependent information required for the measurements related to verification can be made to arrive simultaneously at the device at the location to be verified and not prior to the arrival of the specific qubit to which the information is related. Possibilities beyond Bell state operators are available, such as operators having eigenstates that are such that only local measurements can prepare the states (e.g., certain operators having eigenstates which are non-maximally entangled states. Extensions to the use of a number of reference stations greater than two allow for higher-dimensional operators—operators can be non-symmetric (quantum states of different dimensions are output). The states being measured at the device at the location to be verified may be entangled with other qubits held by the reference stations. Different output systems from measurements can be instructed to be sent to specific reference stations. The outputs may be purely classical, purely quantum, or a mixture of both. Instead of using time as a label to distinguish qubits when using outcomes from previous measurements as a form of dependency, other labels (such as memory address) can be used or other degrees of freedom (such as frequency) can be used. This allows for information relating to multiple qubits, or multiple qubits, to arrive simultaneously at the device at the location to be verified. Information relating to these labels (and the order the labelled qubits are processed) can be sent from multiple reference stations in a dependent manner. Indeed, any information relating to processing at the device at the location to be verified can be made to be dependent information. The states being measured at the device at the location to be verified may not necessarily be entangled with each other. For example, a virtual equivalent of the protocol of Table 1 is where a measurement is made on one of the qubits at one of the reference stations prior to sending the qubit to the device at the location to be verified. Classical information related to that qubit measurement can be sent to the device at the location to be verified instead of the actual qubit that was measured. This classical information may re-encoded and can also be made to be dependent information that is sent from multiple reference stations.

More complex set-ups in the URT context are considered hereinafter. An example of a more complex set-up in this context is deployment of measurement operators having eigenstates that are non-maximally entangled states. In addition, consider the situation where the quantum systems initially held by the reference stations are in the form of non-maximally entangled states (not necessarily the same non-maximally entangled at each station and not necessarily the same as the eigenstates of the measurement operator). With the introduction of non-maximally entangled states, systems can be created where the final entangled states held by the reference stations (after entanglement swapping) are in one of a possible set of states. This set is a function of the eigenstates of the operator used to conduct a measurement (in the general case, the final entangled states held by the reference stations are not identical to the eigenstates of the measurement operator). Other set-up conditions are available. The form of a non-maximally entangled state at a reference station may be randomly set at the time of creation. Additional classical messages may be utilized containing information, dynamically and randomly generated by each reference station, and sent by each reference station to the communication transceiver at the location to be verified, at the same time the quantum information is sent by each reference station. All, or some, of the information in these additional classical messages may then be used as inputs to a function $f_m$. The communication transceiver at the location to be verified may be instructed (dependent on the output of the function $f_m$) to utilise a particular measurement operator (with particular non-maximally entangled eigenstates). Alternatively, the communication transceiver at the location to be verified may be instructed not to measure some or all the quantum states sent to the communication transceiver at the location to be verified, but rather to forward some or all of the quantum states, either unmeasured or modified in a particular manner, to one or more of the reference stations. The specific nature of the function $f_m$ (and the output-dependent instructions) may be encoded in dependent information. The function $f_m$ can be made a function of time.

When using non-maximally entangled states (either as eigenstates of the measurement operator and/or as the states created at the reference station), the verification process may involve the statistics of the verification measurements conducted by the reference stations. Random rotations can be added to the states held at the reference stations and then that rotation information can be sent via (potentially dependent) classical messages to the device at the location to be verified. Although this again leads to more robustness of the system, this latter addition has the drawback that this latter addition would not (in most instances) be beneficial in the URT context, since classical information would need to be stored prior to the creation of the quantum systems (use of dependent messaging to construct $f_m$ also suffers from this drawback).

Some of the more complex set-ups, discussed hereinbefore, may be applied to all location verification protocols. Combinations of such set-ups are also possible, the applicability of which is dependent on the specific location verification protocol being used. Other classical and/or quantum channels (beyond the channels mentioned hereinbefore), use of alternating or random information flows, and additional complexity of the message dependency (beyond that mentioned hereinbefore) may be used to provide additional set-ups and additional robustness of the verification protocol. In protocols where random unitary matrices have not been applied, these random unitary matrices may be applied along with additional classical (possibly dependent) messages. Although entangled quantum states have been focused on, quantum location verification can in principal be obtained using other states that are not entangled, provided the states possess non-locality features (e.g. locally immeasurable in spite of allowing unlimited classical communication). Even in those set-ups vulnerable in some threat models, the verification protocol can force an adversary to deploy much larger physical resources (in most cases unbounded) relative to a non-adversary. This is particularly so for larger quantum systems initially distributed over more than two reference stations. The requirement for complexity in any set-up may be measured against the threat model deemed appropriate, and/or the perceived technical capability and resources of any potential adversary. Once the threat model is decided upon, unconditional security can be assured, meaning that no known attack can spoof the location verification system. Verification is achieved deterministically in the sense that the probability of spoofing approaches zero as number of rounds of the protocol increases.

The foregoing describes only some embodiments of the present invention, and modifications and/or changes can be made thereto without departing from the scope and spirit of the invention, the embodiments being illustrative and not restrictive.

The claims defining the invention are as follows:

1. A method of verifying the location of a communication transceiver at a location to be verified, said method comprising:

using quantum communication channels;

differentiating a first set of signals and a second set of signals;

wherein the differentiating includes using a plurality of communications transceivers at a plurality of different known locations along with a set of states of particles and applying unitary transforms within said states of particles said transforms having the significance of ensuring that a random sequence encoded within the said set of states of particles can only be received and responded to correctly within a certain time bound by a receiver at the location to be verified;

with at least two communications transceivers at different known locations having a secure channel therebetween;

transmitting said set of states of particles, with at least some states of particles being transmitted using said quantum communication channels;

verifying the location of said communication transceiver at a location to be verified based on receiving the first set of signals at at-least one of the plurality of communication transceivers, with the first set of signals not having a delay or content being inconsistent with the communication transceiver at a location to be verified actually being at the location to be verified, said first set of signals being related to the said states of particles;

wherein the differentiating further includes receiving the second set of signals at the at-least one of the plurality of communication transceivers based on the second set of signals having at least one of delay and content being inconsistent with the communication transceiver at a location to be verified actually being at the location to be verified; recognizing the second set of signals as representing a risk of malicious behavior.

2. The method as claimed in claim 1, wherein said particles are entangled particles.

3. The method as claimed in claim 2, further comprising the steps of:
- choosing from at least three communications transceivers at different known locations groups of communications transceivers and where members of each group of communications transceivers communicate via a secure channel a random bit sequence to be encoded in states of entangled particles with the particles entangled with each other being shared by each member of each group of communications transceivers;
- applying said unitary transforms to a set of said states of entangled particles formed from said random bit sequence by members of each group of communications transceivers;
- transmitting to said communication transceiver at the location to be verified said encoded states of entangled particles from each group of communications transceivers via separate communication channels between said members of each group of communications transceivers at known locations and said communication transceiver at the location to be verified, said known locations being different to said location to be verified;
- transmitting to said communication transceiver at the location to be verified said unitary transforms from each member of each group of communications transceivers at said known locations via separate communication channels;
- checking by each member of each group of communications transceivers at said known locations for a portion of said transmitted, encoded set of states of entangled particles from said communication transceiver at the location to be verified that is correctly decoded by said communication transceiver at the location to be verified and for the arrival time of said decoded portion of said transmitted, encoded set of states of entangled particles; and
- verifying the location of said communication transceiver at the location to be verified by said members of each group of communications transceivers at said known locations if said transmitted, encoded set of states of entangled particles from said communication transceiver at the location to be verified is correctly decoded and round-trip times determined by said communications transceivers at said known locations satisfy respective expected round-trip times for said communication transceiver at a location.

4. The method as claimed in claim 3, wherein each group of communications transceivers comprises:
- a pair of communications transceivers, or
- triplets of communications transceivers.

5. The method as claimed in claim 3, wherein classical information transmitted by said communication transceivers at known locations is synchronized to arrive simultaneously at the communication transceiver at the location to be verified.

6. The method as claimed in claim 3, wherein said states of entangled particles are states of entangled qubit pairs or states of three or more entangled particles.

7. The method as claimed in claim 3, wherein the transformed states of entangled particles are encoded using superdense coding.

8. The method as claimed in claim 3, wherein said step of transmitting said set of entangled states comprises:
- direct transfer of entangled particles; or
- teleporting said set of entangled particles; or
- using entanglement swapping.

9. The method as claimed in claim 3, further comprising the step of transmitting to each member of each group of communications transceivers at said known locations a portion of said transmitted, encoded set of states of entangled particles from said communication transceiver at the location to be verified that is decoded by said communication transceiver at the location to be verified.

10. The method as claimed in claim 3, comprising transmitting classical information by said communication transceivers at different known locations, said classical information being dependent information.

11. The method as claimed in claim 1, wherein said unitary transforms comprise:
- a set of operations that transform the states of said entangled particles into a set of non-orthogonal states; or
- random unitary transforms; or
- a set of identity operators, the states of said entangled particles being orthogonal to each other.

12. The method according to claim 2 for verifying the location in one dimension of a communication transceiver and further comprising the steps of:
- choosing two communications transceivers at different known locations communicating via a secure channel a random bit sequence to be encoded in states of entangled particles with the particles entangled with each other being distributed between said two communications transceivers;
- applying unitary transforms to a set of said states of entangled particles formed from said random bit sequence by said two communications transceivers having said known locations;
- transmitting to said communication transceiver at the location to be verified said encoded states of entangled particles from said two communications transceivers at said known locations via separate communication channels between said communications transceivers at known locations and said communication transceiver at the location to be verified, said known locations being different to said location to be verified;
- transmitting to said communication transceiver at the location to be verified said unitary transforms from said two communications transceivers at said known locations via separate communication channels between said at two communications transceivers at known locations and said communication transceiver at the location to be verified, said known locations being different to said location to be verified;
- checking by said two communications transceivers at said known locations for a portion of said transmitted, encoded set of states of entangled particles from said communication transceiver at the location to be verified that is correctly decoded by said communication transceiver at the location to be verified and for the arrival time of said decoded portion of said transmitted, encoded set of states of entangled particles; and
- verifying the location of said communication transceiver at the location to be verified by said two communications transceivers at said known locations if said transmitted, encoded set of states of entangled particles from said communication transceiver at the location to be verified is correctly decoded and round-trip times determined by said communications transceivers at said known locations satisfy respective expected round-trip times for said communication transceiver at a location.

13. The method as claimed in claim 2, further comprising the steps of:
- creating at least three sets of entangled particles, each set being shared between a communication transceiver at the location to be verified and one of at least three communications transceivers at different known locations, said known locations being different to said location to be verified;
- communicating between said at least three communications transceivers at different known locations labels identifying which particles at said communication transceiver at the location to be verified are entangled with which particles at each of said at least three communications transceivers at different known locations;
- generating a random bit sequence at each one of said at least three communications transceivers at different known locations to be encoded in states of entangled particles shared by each one of said at least three communications transceivers at different known locations and said communication transceiver at the location to be verified;
- transmitting to said communication transceiver at the location to be verified via separate communication channels said entangled particles from said at least three communications transceivers at different known locations;
- transmitting to said communication transceiver at the location to be verified said labels identifying which particles at said communication transceiver at the location to be verified are entangled with which particles at each of said at least three communications transceivers at different known locations;
- decoding by said communication transceiver at the location to be verified said random bit sequence encoded in states of entangled particles shared by each one of said at least three communications transceivers at different known locations and said communication transceiver at the location to be verified;
- transmitting to said at least three communications transceivers at different known locations said random bit sequence encoded in states of entangled particles shared by each one of said at least three communications transceivers at different known locations and said communication transceiver at the location to be verified; and
- verifying the location of said communication transceiver at the location to be verified by said at least three communications transceivers at different known locations if said transmitted, random bit sequence encoded in states of entangled particles shared by each one of said at least three communications transceivers at different known locations and said communication transceiver at the location to be verified is correctly decoded and round-trip times determined by said communications transceivers at said known locations satisfy respective expected round-trip times for said communication transceiver at a location.

14. The method as claimed in claim 2, further comprising the steps of:
- creating two sets of entangled particles, each set being shared between a communication transceiver at the location to be verified and one of two communications transceivers at different known locations, said known locations being different to said location to be verified;
- communicating between said two communications transceivers at different known locations labels identifying which particles at said communication transceiver at the location to be verified are entangled with which particles at each of said two communications transceivers at different known locations;
- generating a random bit sequence at each one of said two communications transceivers at different known locations to be encoded in states of entangled particles shared by each one of said two communications transceivers at different known locations and said communication transceiver at the location to be verified;
- transmitting to said communication transceiver at the location to be verified via separate communication channels said entangled particles from said two communications transceivers at different known locations;
- transmitting to said communication transceiver at the location to be verified said labels identifying which particles at said communication transceiver at the location to be verified are entangled with which particles at each of said two communications transceivers at different known locations;
- decoding by said communication transceiver at the location to be verified said random bit sequence encoded in states of entangled particles shared by each one of said two communications transceivers at different known locations and said communication transceiver at the location to be verified;
- transmitting to said two communications transceivers at different known locations said random bit sequence encoded in states of entangled particles shared by each one of said two communications transceivers at different known locations and said communication transceiver at the location to be verified; and
- verifying the location of said communication transceiver at the location to be verified by said two communications transceivers at different known locations if said transmitted, random bit sequence encoded in states of entangled particles shared by each one of said two communications transceivers at different known locations and said communication transceiver at the location to be verified is correctly decoded and round-trip times determined by said communications transceivers at said known locations satisfy respective expected round-trip times for said communication transceiver at a location.

15. The method as claimed in claim 2, comprising the step of encoding a k-bit message by making the $2^k$ states of said entangled particles non-orthogonal using an additional local unitary transformation at each communications transceiver at different known locations.

16. The method as claimed in claim 2, wherein a communication channel can be unconditionally authenticated based on the geographical coordinates of said communication transceiver at the location to be verified.

17. The method as claimed in claim 1, wherein said particles are photons.

18. The method as claimed in claim 1, comprising encrypting classical communications between said communications transceivers at different known locations using QKD or another quantum encryption technique.

19. The method as claimed in claim 1, comprising encrypting classical communications between at least one communications transceiver at a known location and another device using QKD or other quantum encryption techniques.

20. The method as claimed in claim 1, further comprising the step of using dependent information by said communication transceiver at a location to be verified, said dependent information being information required for a step of said method that can only be constructed upon receipt of messages from at least two communications transceivers at different known locations.

21. The method as claimed in claim 1, wherein said particles are transmitted by:
   direct transfer of said particles; or
   teleporting said particles.

22. The method as claimed in claim 1, comprising utilising state encoding and deterministically discriminating amongst encoded states within a pre-described time bound at only one location.

23. The method as claimed in claim 22, comprising encoding a k-bit message by making the $2^k$ states of said particles non-orthogonal using an additional local unitary transformation at each of said communications transceivers at different known locations.

24. The method as claimed in claim 1, comprising:
   transmitting using quantum communications channels from each of at least two communications transceivers at different known locations at least one particle of a quantum system to arrive simultaneously with other transmitted particles at said communication transceiver at a location to be verified, each transmitted particle being one of at least two particles of each quantum system;
   retaining at least one other particle of the respective quantum system by each of said communications transceivers at different known locations;
   receiving by each of said communications transceivers at different known locations at least one measured result immediately broadcast by said communication transceiver at a location to be verified;
   calculating a time of receipt by each of said communications transceivers at different known locations, said time of receipt being the round trip time of transmitting said particle of said respective quantum system and receipt of said broadcast measured result;
   transmitting using quantum communications channels by each of said communications transceivers at different known locations the retained particle to said authenticated communication transceiver;
   measuring by said authenticated communication transceiver the transmitted retained particles from said communications transceivers at different known locations; and
   determining whether or not said communication transceiver at a location to be verified is at the location purported to be the location of said communication transceiver at a location to be verified dependent upon said time of receipt by each of said communications transceivers at different known locations and upon the measurement result for the retained particles and the broadcast measured result received by said communications transceivers at different known locations.

25. The method as claimed in claim 24, comprising transmitting by each of said communications transceivers at different known locations to said authenticated communication transceiver:
   said time of receipt of the broadcast measured result; or
   the broadcast measured result received by said communications transceivers at different known locations.

26. The method as claimed in claim 25, wherein one of said communications transceivers at different known locations that is different to said authenticated communications transceiver measures said retained particles.

27. The method as claimed in claim 24, wherein said determining step is implemented by said authenticated communication transceiver.

28. The method as claimed in claim 24, further comprising:
   receiving by said communication transceiver at the location to be verified the transmitted particles of the quantum systems from said communications transceivers at different known locations;
   measuring immediately by said communication transceiver at the location to be verified said received particles of the quantum systems; and
   broadcasting immediately by said communication transceiver at the location to be verified at least one measured result to said communications transceivers at different known locations.

29. The method as claimed in claim 24, wherein each measuring step is implemented using one type of measurement for one group of particles and at least one other type of measurement for another group of particles.

30. The method as claimed in claim 24, wherein the at least one measured result is classically encoded.

31. The method as claimed in claim 24, further comprising the step of verifying the receipt times from said communications transceivers at different known locations are consistent with the communications transceiver being located at a location.

32. The method as claimed in claim 24, wherein the steps are repeated for all N quantum systems held by each of said communications transceivers at different known locations.

33. The method as claimed in claim 24, wherein one or more particles of the quantum systems is a qubit or qudit.

34. The method as claimed in claim 24, wherein at least one particle is entangled with another particle.

35. The method as claimed in claim 24, wherein one or more of said measuring steps involves a projection onto a GHZ state, a projection onto another multipartite state of said particles of the quantum system, or a Bell state measurement of said particles of the quantum systems.

36. The method as claimed in claim 24, wherein a device generates the quantum systems and provides said quantum systems to said communications transceivers at different known locations.

37. The method as claimed in claim 24, wherein said authenticated communications transceiver is one of said communications transceivers at different known locations.

38. The method as claimed in claim 24, wherein one or more of said communications transceivers at different known locations is a reference station.

39. The method as claimed in claim 24, wherein said communication transceiver at the location to be verified generates immediately a plurality of measured results.

40. The method as claimed in claim 39, wherein said communication transceiver at the location to be verified broadcasts immediately said plurality of measured results to said communications transceivers at different known locations.

41. The method as claimed in claim 24, wherein one or more of said measuring steps involves the use of an operator having:
   eigenstates that are non-maximally entangled states; or
   other states that cannot be locally measured.

42. The method as claimed in claim 24, wherein one or more of said measuring steps involves the use of a measurement operator that can only locally prepare eigenstates of said measurement operator.

43. A method of verifying the location of a communication transceiver at a location to be verified, said method comprising:
   using quantum communication channels;
   transmitting to a communication transceiver at a location to be verified a set of particles from a plurality of communications transceivers at a plurality of different known locations, with at least two communications transceivers at different known locations having a secure channel therebetween, and with at least some particles being transmitted using said quantum communication channels;

constructing, upon receipt of messages transmitted from at least two communications transceivers at different known locations, by said communication transceiver at a location to be verified a step of a location verification protocol that can only be constructed using dependent information from said received messages;

differentiating a first set of signals and a second set of signals;
  wherein the differentiating includes using a plurality of communications transceivers at a plurality of different known locations along with a set of states of particles and applying unitary transforms within said states of particles said transforms having the significance of ensuring that a random sequence encoded within the said set of states of particles can only be received and responded to correctly within a certain time bound by a receiver at the location to be verified;
  wherein the differentiating includes verifying the location of said communication transceiver at a location to be verified based on receiving the first set of signals at at-least one of the plurality of communication transceivers, with the first set of signals not having a delay or content being inconsistent with the communication transceiver at a location to be verified actually being at the location to be verified, said first set of signals being related to the said set of particles;
  wherein the differentiating further includes receiving the second set of signals at at-least one of the plurality of communication transceivers based on the second set of signals having at least one of delay and content being inconsistent with the communication transceiver at a location to be verified actually being at the location to be verified; recognizing the second set of signals as representing a risk of malicious behavior.

44. A system for verifying the location of a communication transceiver at a location to be verified, said system comprising:
  a secure channel between at least two communications transceivers at different known locations;
  quantum communication channels; and
  a plurality of communications transceivers at different known locations configured for: differentiating a first set of signals and a second set of signals;
    wherein the differentiating includes using a plurality of communications transceivers at a plurality of different known locations along with a set of states of particles and applying unitary transforms within said states of particles said transforms having the significance of ensuring that a random sequence encoded within the said set of states of particles can only be received and responded to correctly within a certain time bound by a receiver at the location to be verified;
    with at least two communications transceivers at different known locations having a secure channel therebetween;
    transmitting said set of states of particles, and with at least some states of particles being transmitted using said quantum communication channels; verifying the location of said communication transceiver at a location to be verified based on receiving the first set of signals at at-least one of the plurality of communication transceivers, with the first set of signals not having a delay or content being inconsistent with the communication transceiver at a location to be verified actually being at the location to be verified, said first set of signals being related to the said states of particles;
    wherein the differentiating further includes receiving, the second set of signals at at-least one of the plurality of communication transceivers based on the second set of signals having at least one of delay and content being inconsistent with the communication transceiver at a location to be verified actually being, at the location to be verified; recognizing the second set of signals as representing a risk of malicious behavior.

45. The system as claimed in claim 44, wherein said particles are entangled particles.

46. The system as claimed in claim 45, comprising:
at least three communications transceivers at different known locations, said at least three communications transceivers communicating via secure channels, said communications transceivers comprising:
  means for choosing from at least three communications transceivers at different known locations and means for choosing groups of communications transceivers and where members of each group of communications transceivers communicate via a secure channel a random bit sequence to be encoded in states of entangled particles with the particles entangled with each other being shared by each member of each group of communications transceivers;
  means for applying unitary transforms to a set of said states of entangled particles formed from said random bit sequence by members of each group of communications transceivers;
  means for transmitting to said communication transceiver at the location to be verified said encoded states of entangled particles from each group of communications transceivers via separate communication channels between said members of each group of communications transceivers at known locations and said communication transceiver at the location to be verified, said known locations being different to said location to be verified;
  means for transmitting to said communication transceiver at the location to be verified said unitary transforms from each member of each group of communications transceivers at said known locations via separate communication channels;
  means for checking by said each member of each group of communications transceivers at said known locations for a portion of said transmitted, encoded set of states of entangled particles from said communication transceiver at the location to be verified that is correctly decoded by said communication transceiver at the location to be verified and for the arrival time of said decoded portion of said transmitted, encoded set of states of entangled particles; and
  means for verifying the location of said communication transceiver at the location to be verified by each member of each group of communications transceivers at said known locations if said transmitted, encoded set of states of entangled particles from said communication transceiver at the location to be verified is correctly decoded and round-trip times determined by said communications transceivers at said known locations satisfy respective expected round-trip times for said communication transceiver at a location.

47. The system as claimed in claim 44, comprising means for encoding a k-bit message by making the $2^k$ states of said entangled particles non-orthogonal using an additional local unitary transformation at each communications transceiver at different known locations.

48. The system as claimed in claim 44, comprising
at least two communications transceivers at different known locations; and
an authenticated communications transceiver;
said communications transceivers at different known locations each comprising:
  means for transmitting using quantum communications channels from each of at least two communications transceivers at different known locations at least one particle of a quantum system to arrive simultaneously with other transmitted particles at said communication transceiver at a location to be verified, each transmitted particle being one of at least two particles of each quantum system;
  means for retaining at least one other particle of the respective quantum system by each of said communications transceivers at different known locations;
  means for receiving by each of said communications transceivers at different known locations at least one measured result immediately broadcast by said communication transceiver at a location to be verified;
  means for calculating a time of receipt by each of said communications transceivers at different known locations, said time of receipt being the round trip time of transmitting said particle of said respective quantum system and receipt of said broadcast measured result;
said system further comprising:
  means for transmitting using quantum communications channels by each of said communications transceivers at different known locations the retained particle to said authenticated communication transceiver;
  means for measuring by said authenticated communication transceiver the transmitted retained particles from said communications transceivers at different known locations; and
  means for determining transceiver whether or not said communication transceiver at a location to be verified is at the location purported to be the location of said communication transceiver at a location to be verified dependent upon said time of receipt by each of said communications transceivers at different known locations and upon the measurement result for the retained particles and the broadcast measured result received by said communications transceivers at different known locations.

49. The system as claimed in claim 48, comprising means for transmitting by each of said communications transceivers at different known locations the broadcast measured result received by said communications transceivers at different known locations to an authenticated communication transceiver.

50. The system as claimed in claim 44, comprising means for encrypting classical communications between said communications transceivers at different known locations using QKD or another quantum encryption technique.

51. The system as claimed in claim 44, comprising encrypting classical communications between at least one communications transceiver at a known location and another device using QKD or other quantum encryption techniques.

52. A system for verifying the location of a communication transceiver at a location to be verified, said system comprising:
  a secure channel between at least two communications transceivers at different known locations;
  quantum communication channels; and
  a plurality of communications transceivers at different known locations configured for:
  transmitting to a communication transceiver at a location to be verified a set of particles, with at least some particles being transmitted using said quantum communication channels;
  constructing, upon receipt of messages transmitted from at least two communications transceivers at different known locations, by said communication transceiver at allocation to be verified a step of a location verification protocol that can only be constructed using dependent information from said received messages;
  differentiating a first set of signals and a second set of signals;
    wherein the differentiating includes using a plurality of communications transceivers at a plurality of different known locations along with a set of states of particles and applying unitary transforms within said states of particles said transforms having the significance of ensuring that a random sequence encoded within the said set of states of particles can only be received and responded to correctly within a certain time bound by a receiver at the location to be verified;
    wherein the differentiating includes verifying the location of said communication transceiver at a location to be verified based on receiving the first set of signals at at-least one of the plurality of communication transceivers, with the first set of signals not having a delay or content being inconsistent with the communication transceiver at a location to be verified actually being at the location to be verified, said first set of signals being related to the said set of particles;
    wherein the differentiating further includes receiving the second set of signals at at-least one of the plurality of communication transceivers based on the second set of signals having at least one of delay and content being inconsistent with the communication
  transceiver at a location to be verified actually being at the location to be verified; recognizing the second set of signals as representing a risk of malicious behavior.

* * * * *